(12) United States Patent
Kovács et al.

(10) Patent No.: US 12,745,200 B2
(45) Date of Patent: Sep. 22, 2026

(54) PRECISION TIME PROTOCOL LINK TIME ERROR CALIBRATION USING OVER-THE-AIR SYNCHRONIZATION

(71) Applicant: Telefonaktiebolaget LM Ericsson (PUBL), Stockholm (SE)

(72) Inventors: Gábor Kovács, Dunakeszi (HU); Andreas Olsson, Askim (SE); Mikael Johansson, Solna (SE); Stefano Ruffini, Rome (IT)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 309 days.

(21) Appl. No.: 18/575,175

(22) PCT Filed: Jul. 1, 2021

(86) PCT No.: PCT/EP2021/068216
§ 371 (c)(1),
(2) Date: Dec. 28, 2023

(87) PCT Pub. No.: WO2023/274543
PCT Pub. Date: Jan. 5, 2023

(65) Prior Publication Data

US 2024/0298281 A1 Sep. 5, 2024

(51) Int. Cl.
*H04W 76/10* (2018.01)
*H04J 3/06* (2006.01)
*H04W 56/00* (2009.01)

(52) U.S. Cl.
CPC ......... *H04W 56/004* (2013.01); *H04J 3/0667* (2013.01)

(58) Field of Classification Search
CPC ....... H04W 76/10; H04W 28/02; H04W 8/24; H04W 56/00; H03L 7/08; H03L 7/087; H04B 17/309; H04B 17/318; H04J 3/06
See application file for complete search history.

(56) References Cited

U.S. PATENT DOCUMENTS 11,800,486 B2 * 10/2023 Manolakos ........... H04W 64/00
2016/0302165 A1 * 10/2016 Da ...................... H04W 56/001
2019/0273571 A1 * 9/2019 Bordogna ............. H04L 1/0046
2022/0283571 A1 * 9/2022 Vieira .............. G05B 19/41865
2022/0353732 A1 * 11/2022 Filippou ........... H04W 28/0289

FOREIGN PATENT DOCUMENTS

EP 2725728 A1 4/2014

OTHER PUBLICATIONS

PCT International Search Report issued for International application No. PCT/EP2021/068216—Mar. 21, 2022.
PCT Written Opinion of the International Searching Authority issued for International application No. PCT/EP2021/068216—Mar. 21, 2022.

* cited by examiner

*Primary Examiner* — Sai Aung
(74) *Attorney, Agent, or Firm* — Baker Botts L.L.P.

(57) ABSTRACT

According to certain embodiments, a method (700) by a network node (660) includes determining (705) a timing error associated with a closed loop comprising at least one radio link between two radio points. The timing error is determined based on at least one timing measurement associated with the at least one radio link. The method further includes adjusting (710) timing information carried over the a timing protocol link based on the timing error associated with the closed loop comprising the at least one radio link.

24 Claims, 19 Drawing Sheets

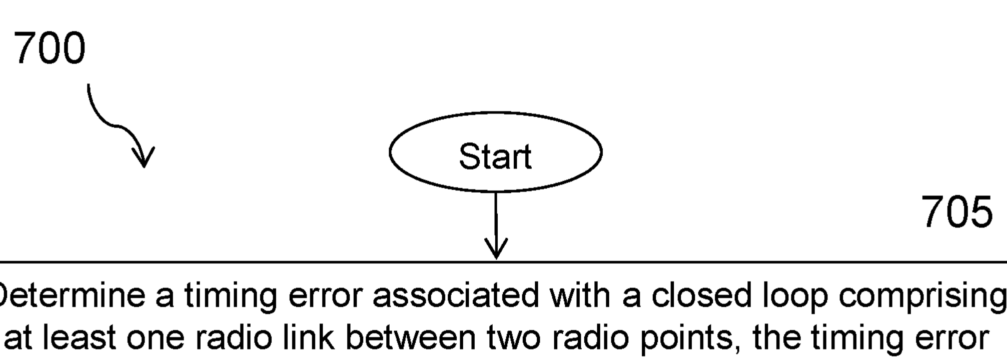

Determine a timing error associated with a closed loop comprising at least one radio link between two radio points, the timing error determined based on at least one timing measurement associated with the at least one radio link

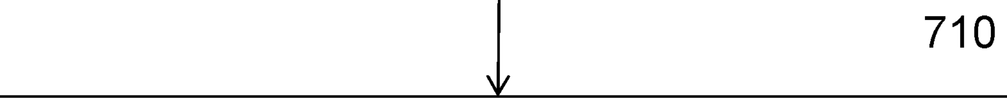

Adjust a Precision Time Protocol (PTP) link based on the timing error associated with the closed loop comprising the at least one radio link

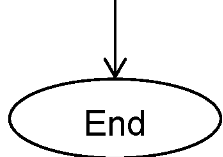

FIGURE 12

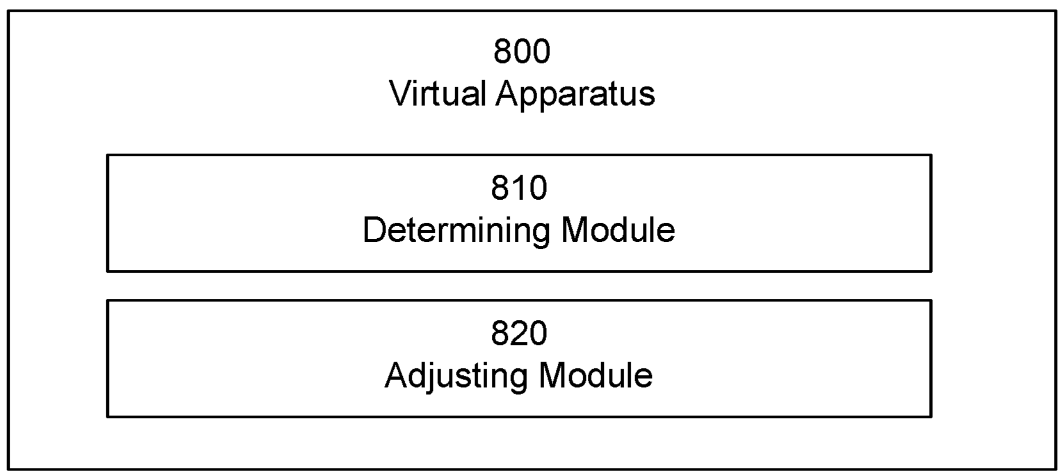

FIGURE 13

PRECISION TIME PROTOCOL LINK TIME ERROR CALIBRATION USING OVER-THE-AIR SYNCHRONIZATION

PRIORITY

This nonprovisional application is a U.S. National Stage Filing under 35 U.S.C. § 371 of International Patent Application Serial No. PCT/EP2021/068216 filed Jul. 1, 2021 and entitled "PRECISION TIME PROTOCOL LINK TIME ERROR CALIBRATION USING OVER-THE-AIR SYNCHRONIZATION," which is hereby incorporated by reference in its entirety.

TECHNICAL FIELD

The present disclosure relates, in general, to wireless communications and, more particularly, systems and methods for precision time protocol (PTP) link time error calibration using over-the-air synchronization.

BACKGROUND

In Fronthaul networks, relative time alignment is very important in order to enable coordinated features for maximizing network capacity. For time synchronization in telecom network, the standard solution is using Precision Time Protocol (PTP) over the transport network infrastructure. Time Error (TE) in a PTP network is contributed by

- the accuracy of the synchronization devices along the chain (constant and dynamic TE of the clock recovery accuracy, including interface calibration error),
- asymmetries introduced by the physical medium (e.g. fiber asymmetry), and/or
- synchronization topology (longer chains gives higher time error).

While topology and device performance can be controlled by network design, the asymmetry of fibers are typically specific to each installed link and could significantly impact time error of PTP. For example, 20 m difference in the length of fiber pair may result in roughly 100 ns difference in delay. That results in 50 ns TE only due to the link properties. Relative time alignment requirements for coordinated features are in the range of 65 ns/130 ns/260 ns; thus, the example of the 50 ns TE contribution of one link is fairly significant.

Manual calibration of such asymmetry is possible but costly. Typically, manual calibration of asymmetry requires expensive measurement equipment and skilled personnel to perform calibration on the field.

Certain problems exist. For example, there are various methods to calibrate the optical fiber asymmetry. Some of them rely on expensive measurement equipment. Others may rely on some special device setup that may do self-calibration. Most of these methods also require experienced technicians on field and manual activities, which make such solution not scalable with large deployments.

As another example, all calibration methods are service interrupting.

In addition, such calibrations are one-time actions that need to be repeated once circumstances change. A continuous calibration process is usually not feasible.

SUMMARY

Certain aspects of the present disclosure and their embodiments may provide solutions to these or other challenges. For example, according to certain embodiments, automated methods and systems are provided to calibrate asymmetry of PTP links (including both fiber asymmetry and constant time error of the clock recovery) in a telecommunication network.

According to certain embodiments, a method by a network node includes determining a timing error associated with a closed loop comprising at least one radio link between two radio points. The timing error is determined based on at least one timing measurement associated with the at least one radio link. The method further includes adjusting timing information carried over the a timing protocol link based on the timing error associated with the closed loop comprising the at least one radio link.

According to certain embodiments, a network node is adapted to determine a timing error associated with a closed loop comprising at least one radio link between two radio points. The timing error is determined based on at least one timing measurement associated with the at least one radio link. The network node adjusts timing information carried over the a timing protocol link based on the timing error associated with the closed loop comprising the at least one radio link.

Certain embodiments may provide one or more of the following technical advantages. For example, one technical advantage may be that certain embodiments provide a solution that can be very easily implemented since it builds on already existing product functionalities and uses existing management channels towards the network elements.

As another example, a technical advantage may be that certain embodiments do not include any complex functionality such as, for example, latency critical control loops or similar, and instead uses simple linear equations that can be solved in non-real-time fashion.

As another example, a technical advantage may be that certain embodiments do not include any time critical functionality. Thus, time errors addressed by the solution may have no or very little time dependency.

As still another example, a technical advantage may be that certain embodiments solve a very important problem related to fiber delay asymmetry calibration and compensation that has no practically feasible known automated solution as of the time of invention.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 12 illustrates an example method by a network node, according to certain embodiments;

FIG. 13 illustrates an example virtual apparatus, according to certain embodiments.

DETAILED DESCRIPTION

Figure 1:
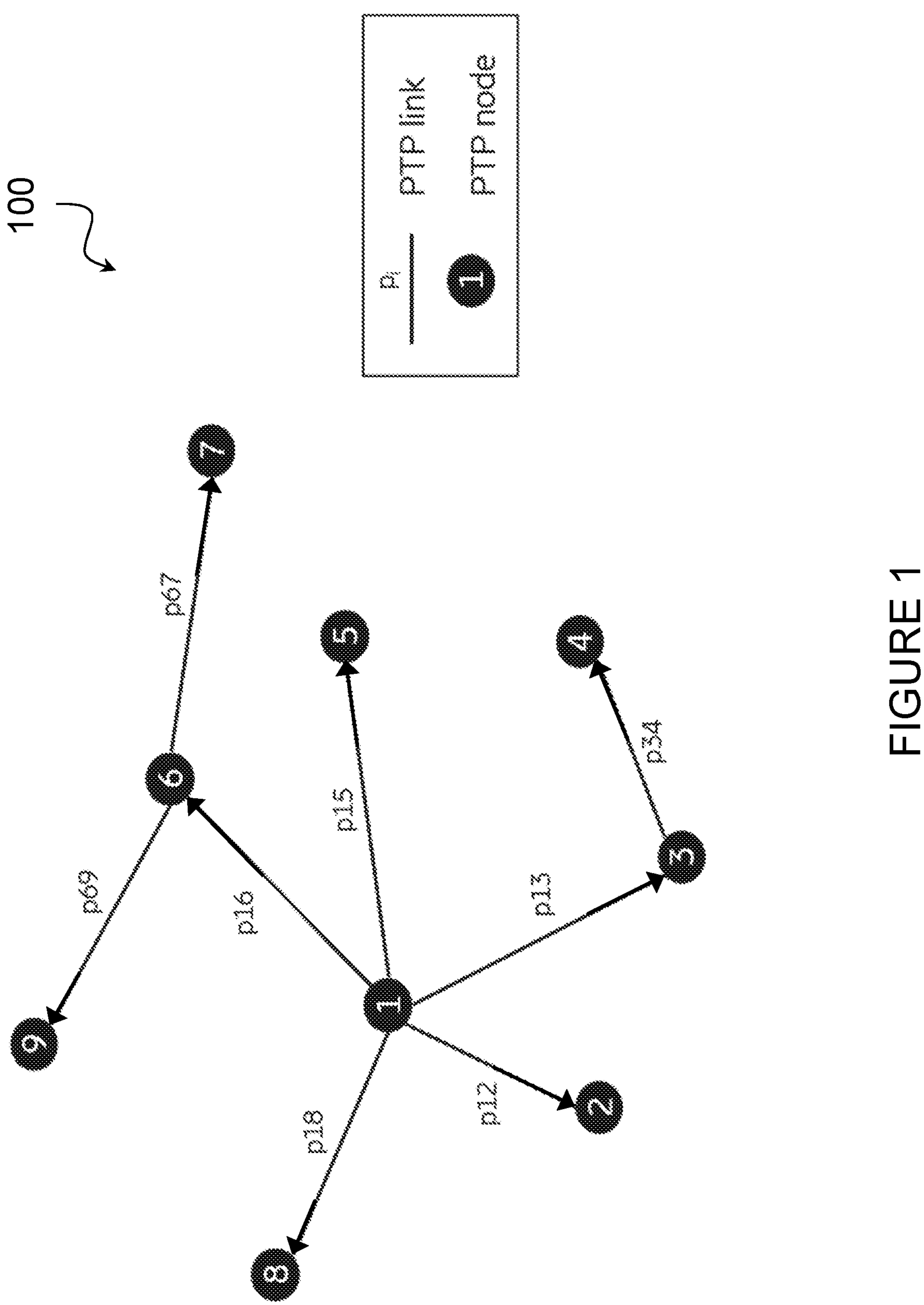
FIG. 1 illustrates an example precision time protocol (PTP) topology of a set of network elements represented by graph P'=(T,p)), according to certain embodiments

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments, a more general term such as "network node" and/or "radio unit (RU)" may be used and may correspond to any type of radio network node or any network node, which communicates with a UE (directly or via another node) and/or with another network node. Examples of network nodes are NodeB, MeNB, ENB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, SON, positioning node (e.g. E-SMLC), MDT, test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, UE category M1, UE category M2, ProSe UE, V2V UE, V2X UE, etc.

Additionally, terminologies such as base station/gNodeB and UE should be considered non-limiting and do in particular not imply a certain hierarchical relation between the two; in general, "gNodeB" could be considered as device 1 and "UE" could be considered as device 2 and these two devices communicate with each other over some radio channel. And in the following the transmitter or receiver could be either gNB, or UE.

According to certain embodiments, automated methods and systems are provided to calibrate asymmetry of timing protocol links such as, for example, PTP links (including both fiber asymmetry and constant time error of the clock recovery) in a telecommunication network. For example, the methods and systems may be used to calibrate in RAN-close transport networks such as, for example, fronthaul networks in C-RAN or E-RAN transport networks where PTP interconnects radio end points, which may also be referred to herein as radio units (RUs).

In RAN networks, the RUs can perform differential time error measurements between each other over the radio interface (same interface used to communicate to UEs can be used to communicate to neighbor RUs)—so called Over-the-Air Synchronization (OAS). By such measurements, RUs can measure their relative time error towards their neighbors.

If both the PTP topology and the OAS measurement topology form a connected graph over the same set of network elements, then PTP link time errors between the network elements can be calculated from the OAS measurements by solving linear equations. Accordingly, certain embodiments described herein utilize a central management logic to collect PTP protocol information from a transport infrastructure to determine PTP master-slave topology. The central management logic may also collect OAS topology and time error measurements from the radio infrastructure to determine relative time error between radio units.

In a particular embodiment, the central management logic may specify equation(s) for the time error calculations for each PTP link based on OAS measurements. The central management logic may then solve the equations, calculate the TE values, and determine the PTP link time errors. The central management logic may apply PTP link asymmetry compensations in the transport infrastructure to minimize residual time error of the end points. The central management logic may also configure PTP devices to compensate their link asymmetry through standard ways (link asymmetry compensation parameter of PTP) without interfering with the clock-recovery mechanisms implemented in the transport nodes.

According to certain embodiments, a PTP network forms a synchronization hierarchy on top of the transport infrastructure in a standard, already exiting way (as per relevant PTP and ITU-T standards). In a particular embodiment, for example, the set of transport network elements may be represented by T, over which the PTP topology is represented by graph P'=(T,p). Then, the same network elements, which may include, for example, RUs, run time error measurements using Over-the-Air Synchronization channel, between all antenna points where this is possible (e.g. as per already implemented OAS in Ericsson RAN). In a particular embodiment, the radio network elements may be represented by R, over which the OAS topology is represented by graph O'=(R,o).

FIG. 1 illustrates an example PTP topology 100 of a set of network elements represented by graph P'=(T,p)), according to certain embodiments. Specifically, FIG. 1 illustrates nine network elements that are PTP nodes (1-9) connected by PTP links, Pi.

Figure 2:
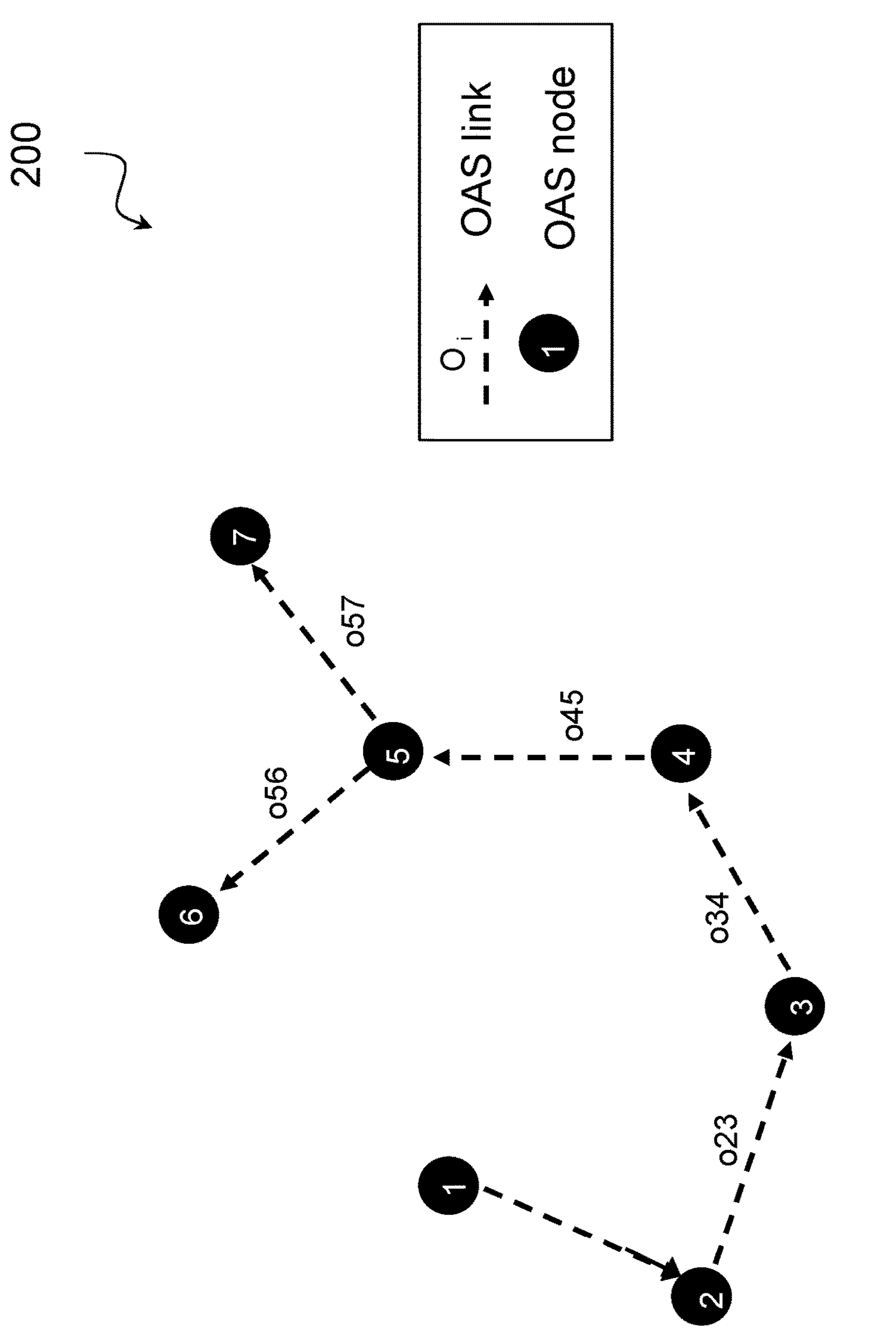
FIG. 2 illustrates an example Over-the-Air Synchronization (OAS) topology of an overlapping set of network elements represented by graph O'=(R,o), according to certain embodiments.

FIG. 2 illustrates an example OAS topology 200 of an overlapping set of network elements represented by graph O'=(R,o), according to certain embodiments. Specifically, FIG. 2 illustrates seven network elements that are OAS nodes (1-7) connected by OAS links, $O_i$. In a particular embodiment, certain or all of the OAS nodes of FIG. 2 overlap certain or all of the PTP nodes of FIG. 1.

Figure 3:
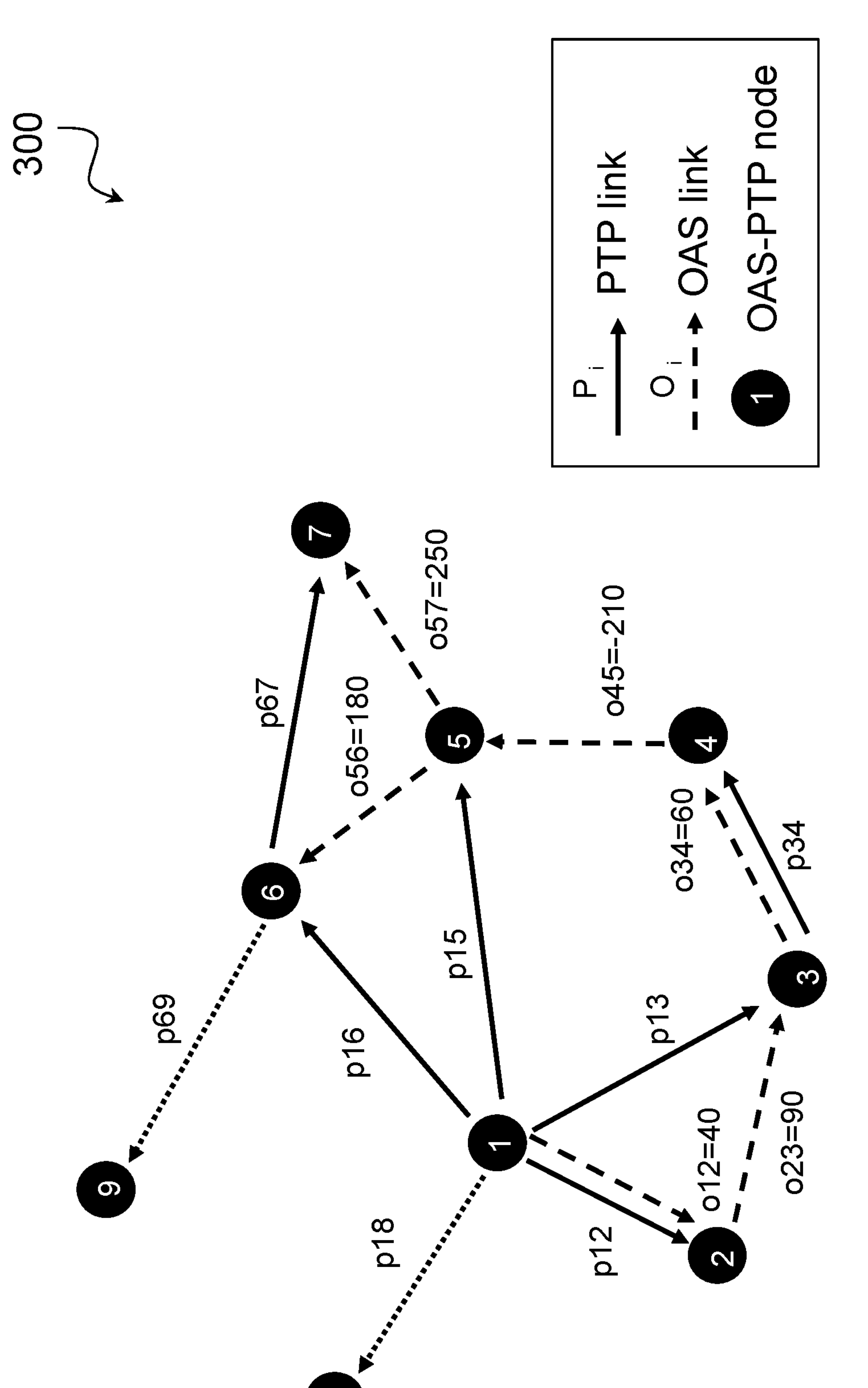
FIG. 3 illustrates an example combined topology where the PTP topology of FIG. 1 is placed over the OAS topology of FIG. 2 (or vice versa), according to certain embodiments.

FIG. 3 illustrates an example combined topology 300 where the PTP topology of FIG. 1 is placed over the OAS topology of FIG. 2 (or vice versa), according to certain embodiments. There are no edges in graph O to node #9 and #8 in FIG. 3. Thus, the links are to node #9 and #8 are shown with fine dashes.

Figure 4:
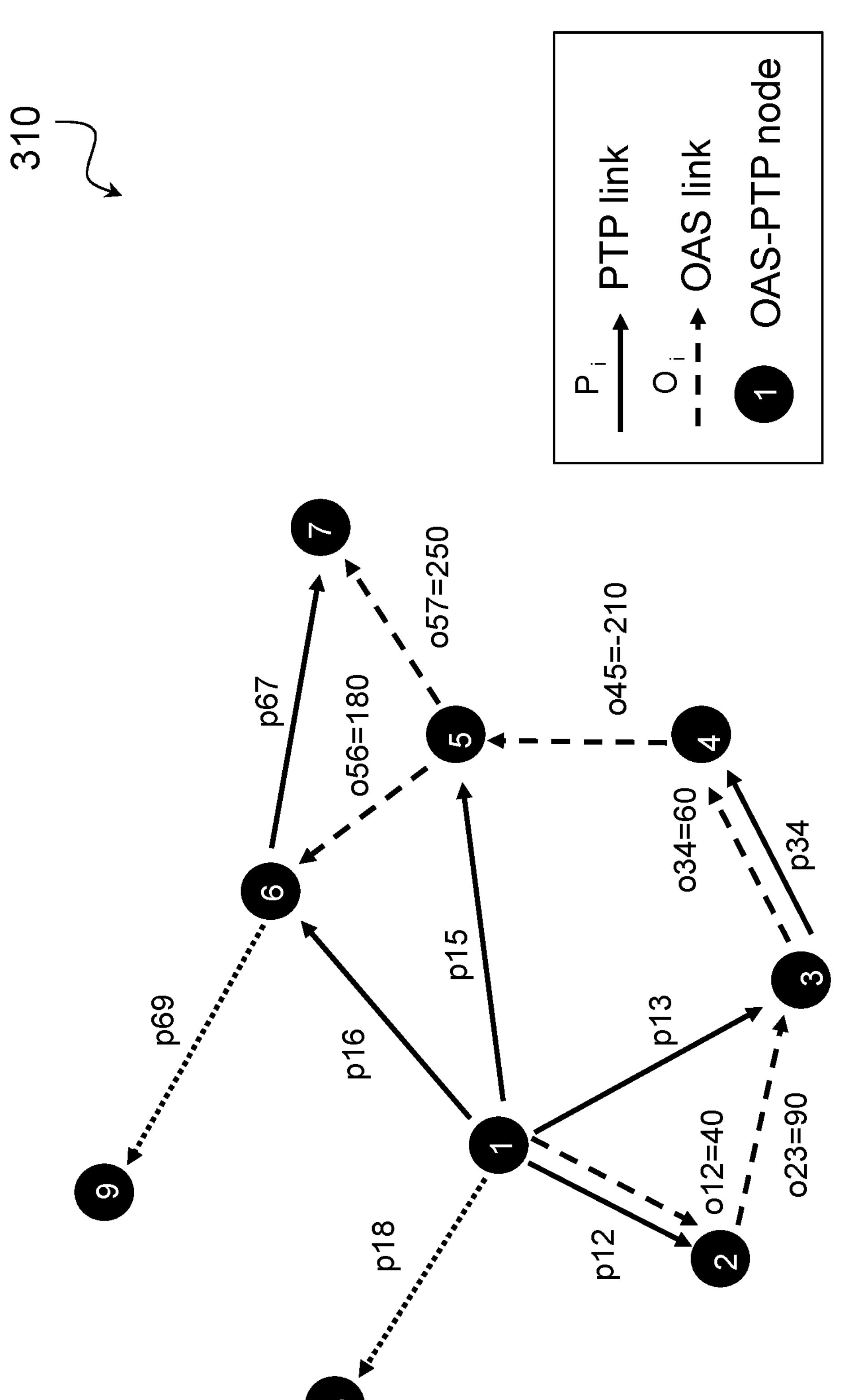
FIG. 4 illustrates another example combined topology that includes nodes #1 to #9, according to a particular embodiment.

FIG. 4 illustrates another example combined topology 310 that includes nodes #1 to #9, according to a particular embodiment. Graph P is connected over all nodes, while graph O is connected only over nodes #1 to #7. Thus, there are no edges in graph O to node #9 and #8, and the links are to node #9 and #8 are again shown with fine dashes. According to certain embodiments, the methods and techniques disclosed herein may be applied on the network including nodes #1 to #7, but link asymmetry of p69 and p18 cannot be determined.

In a particular embodiment, time error values of $o_{ij}$ are measured by the Over-the-air measurement function, and are assumed to be known. Link asymmetris $p_{ij}$ are the link asymmetry values to be determine. Accordingly, one independent equation may be written for each $p_{ij}$ link. It may be recognized that there may be multiple approaches for writing the independent equations. For example, one is to find a loop for each $p_{ij}$ link, where there is no parallel link for p and o, while where there is parallel link for p and o, there OAS directly measures the link asymmetry:

$$p12 = o12 = -40$$

$$p13 = o12 + o23 = -40 + 90 = 50$$

$$p34 = o34 = 60$$

$$p15 = o12 + o23 + o34 + o45 = -40 + 90 + 60 + (-210) = -100$$

$$p16 = o12 + o23 + o34 + o45 + o56 = -40 + 90 + 60 + (-210) + 180 = 80$$

$$p67 = o57 - o56 = 250 - 180 = 70$$

By solving the equations, the link asymmetries of each PTP link may be obtained.

Figure 5:
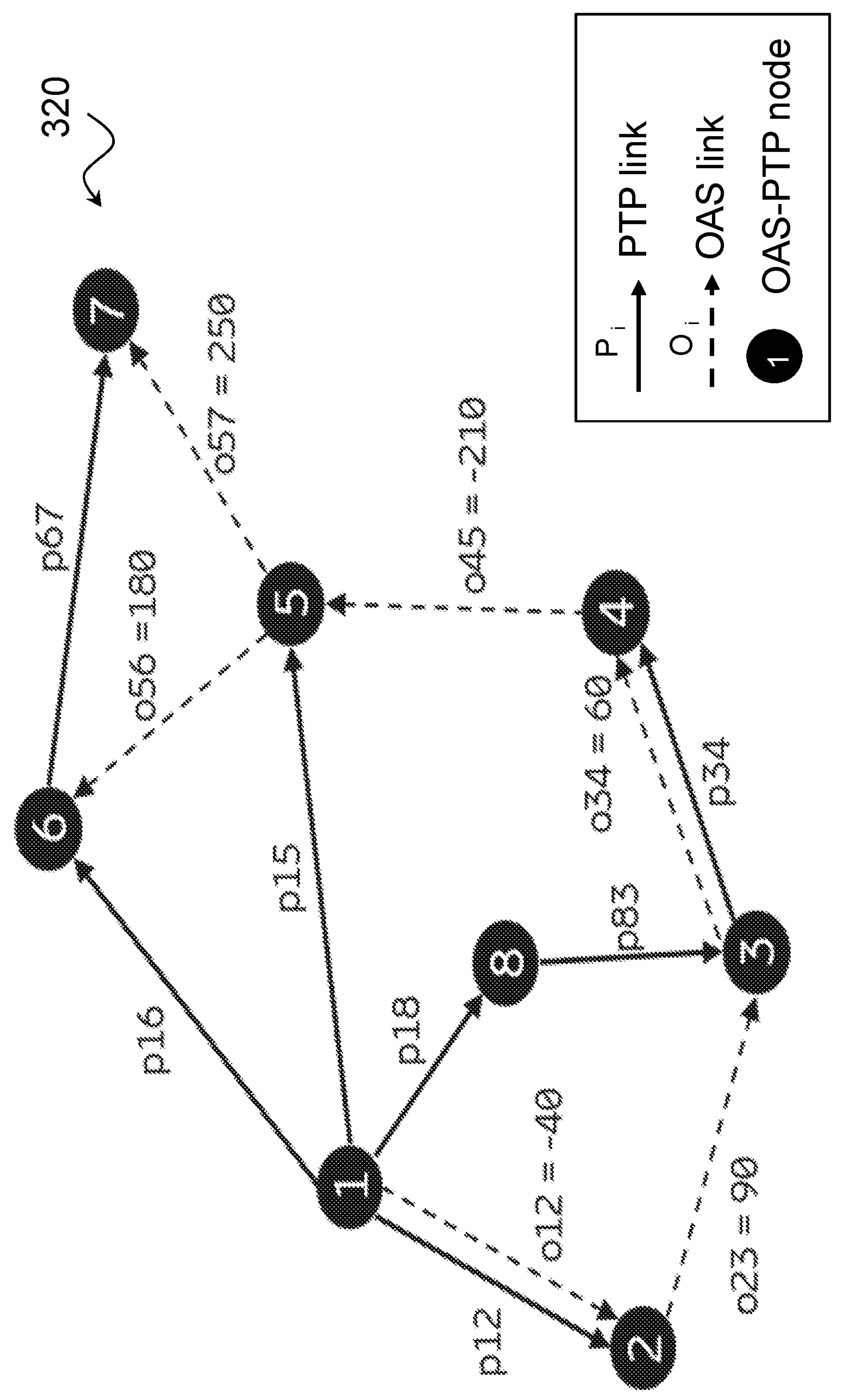
FIG. 5 illustrates another example combined topology that includes nodes #1 to #8, according to a particular embodiment.

FIG. 5 illustrates another example combined topology 320 that includes nodes #1 to #8, according to a particular embodiment. The difference between example combined topology 320 and combined topology 310 is that, in example combined topology 320, node #8 is not part of graph O, but the pair of links $p_{18}$ and $p_{83}$ is connecting node #1 and #3 in graph O. As such, $p_{18}$ and $p_{83}$ cannot be compensated separately. However, for all nodes except #8, the compensation value can be determined using the equations below:

$$p12 = o12 = -40$$

$$p18 + p83 = o12 + o23 = -40 + 90 = 50$$

$$p34 = o34 = 60$$

$$p15 = o12 + o23 + o34 + o45 = -40 + 90 + 60 + (-210) = -100$$

$$p16 = o12 + o23 + o34 + o45 + o56 = -40 + 90 + 60 + (-210) + 180 = 80$$

$$p67 = o57 - o56 = 250 - 180 = 70$$

Figure 6:
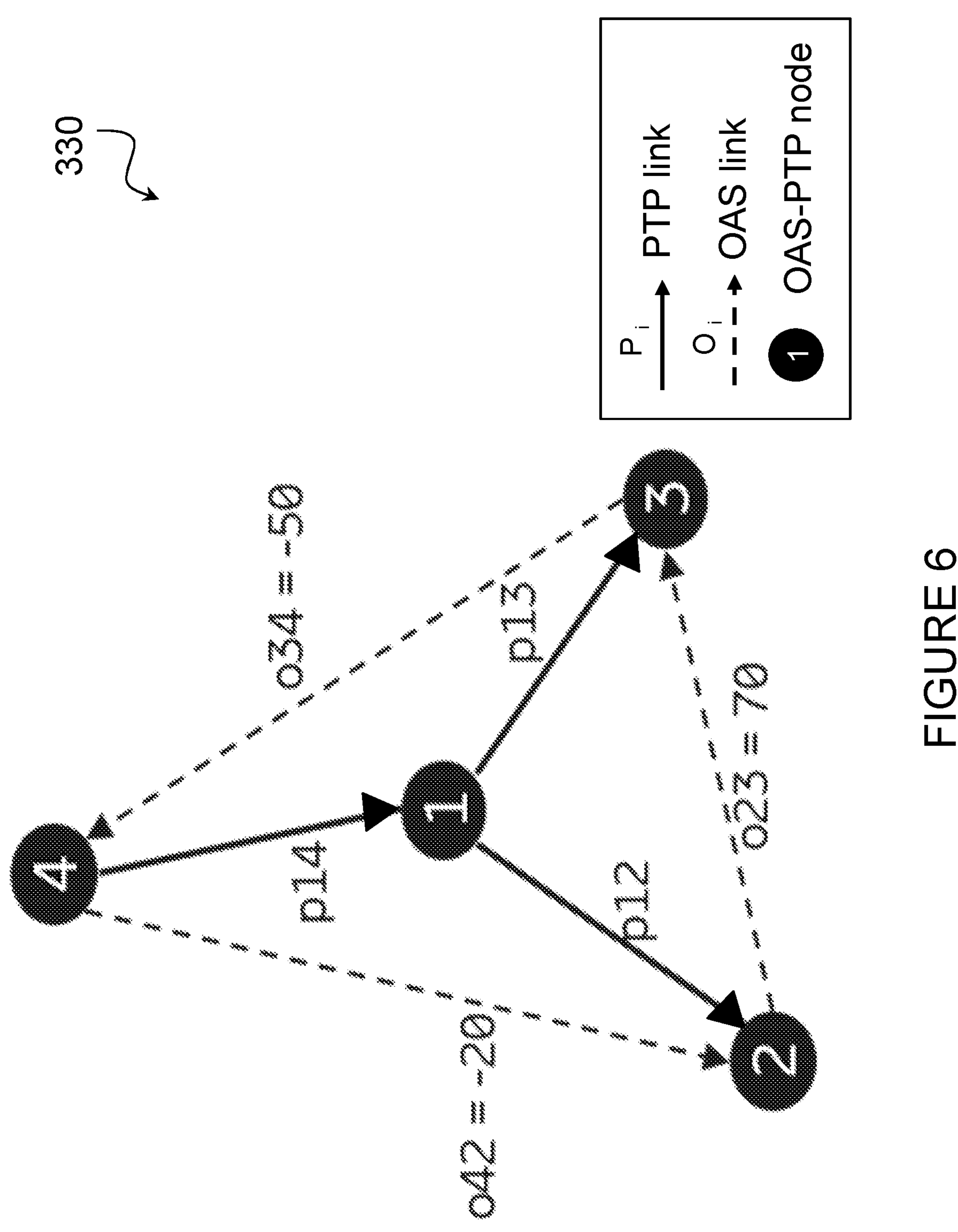
FIG. 6 illustrates another example combined topology that includes nodes #1 to #4, according to a particular embodiment.

FIG. 6 illustrates another example combined topology 330 that includes nodes #1 to #4, according to a particular embodiment. In the depicted example, graph P is connected over all nodes, while graph O is connected only over nodes #2 to #4. Thus, there are no edges in graph O to node #1. According to certain embodiments, the methods and techniques disclosed herein may be applied on the network including nodes #2 to #4 with the restriction that nodes #2 to #4 will be phase aligned, but their error towards node #1 will be unkown.

In the depicted example, time error values of $o_{ij}$ are measured by the Over-the-air measurement function and are assumed to be known. Link asymmetris $p_{ij}$ are the link asymmetry values to be determined, and one equation is written per each $p_{ij}$ link. It may be recognized that there are multiple approaches to do this. For example, according to certain embodiments, one approach is to find a loop for each $p_{ij}$ link:

$$p12 - p13 = o23 = 70$$

$$p13 - p14 = o34 = -50$$

$$p14 - p12 = o42 = -20$$

In the depicted example, the equations are not independent. As such, one of the $p_{ij}$ may be selected as reference, and the relative asymmetry of the other links may be determined compared to the reference:

$$\Delta p12 = 0 \text{ (reference)}$$

$$\Delta p13 = 70$$

$$\Delta p14 = 20$$

Figure 7:
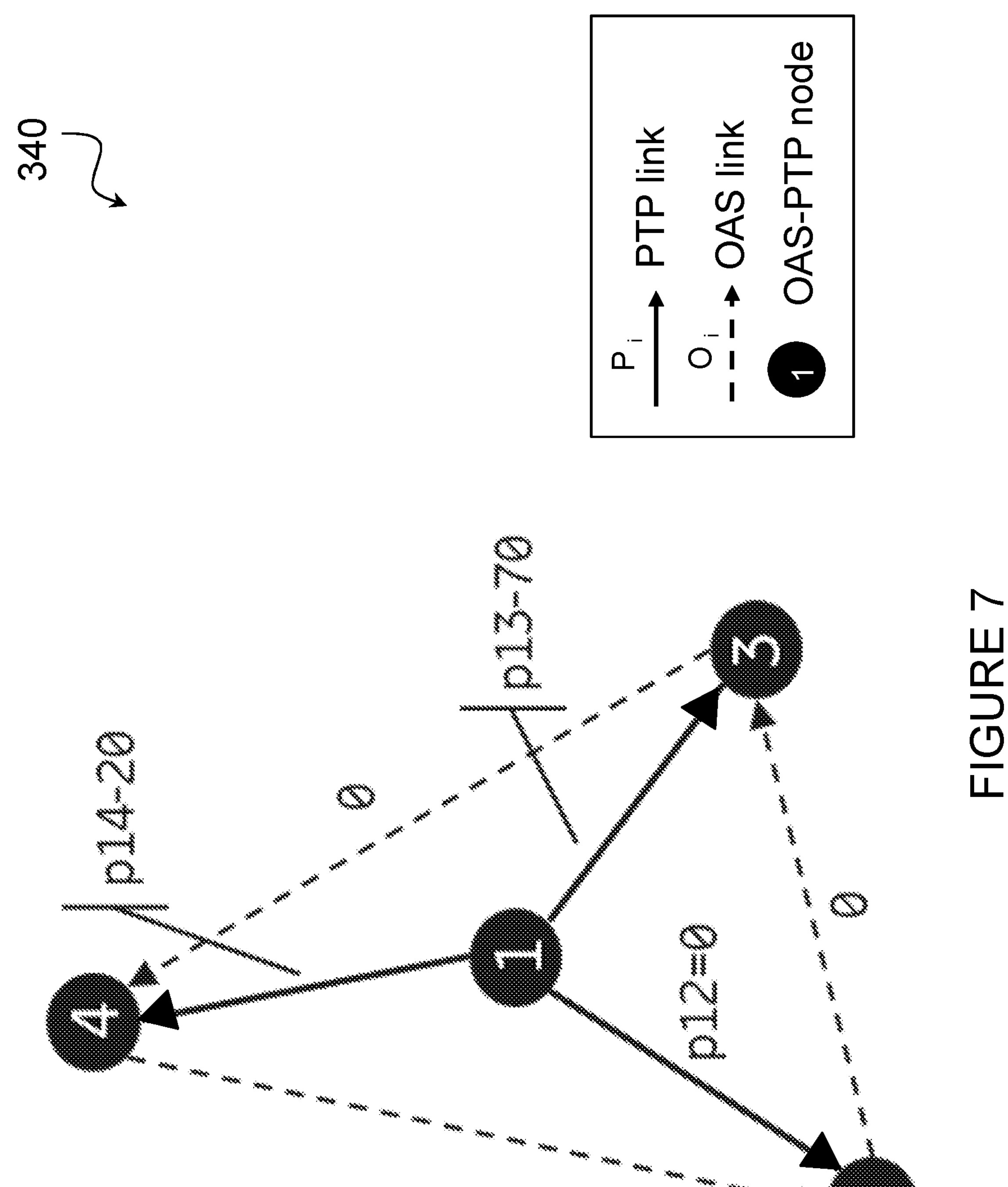
FIG. 7 illustrates an example combined topology 340 where the relative time error of nodes #2 to #4 has been changed to 0, according to certain embodiments.

By applying these compensation values to the corresponding $p_{ij}$ links, the relative time error of nodes #2 to #4 may be changed to 0. FIG. 7 illustrates an example combined topology 340 where the relative time error of nodes #2 to #4 has been changed to 0, according to certain embodiments.

Figure 8:
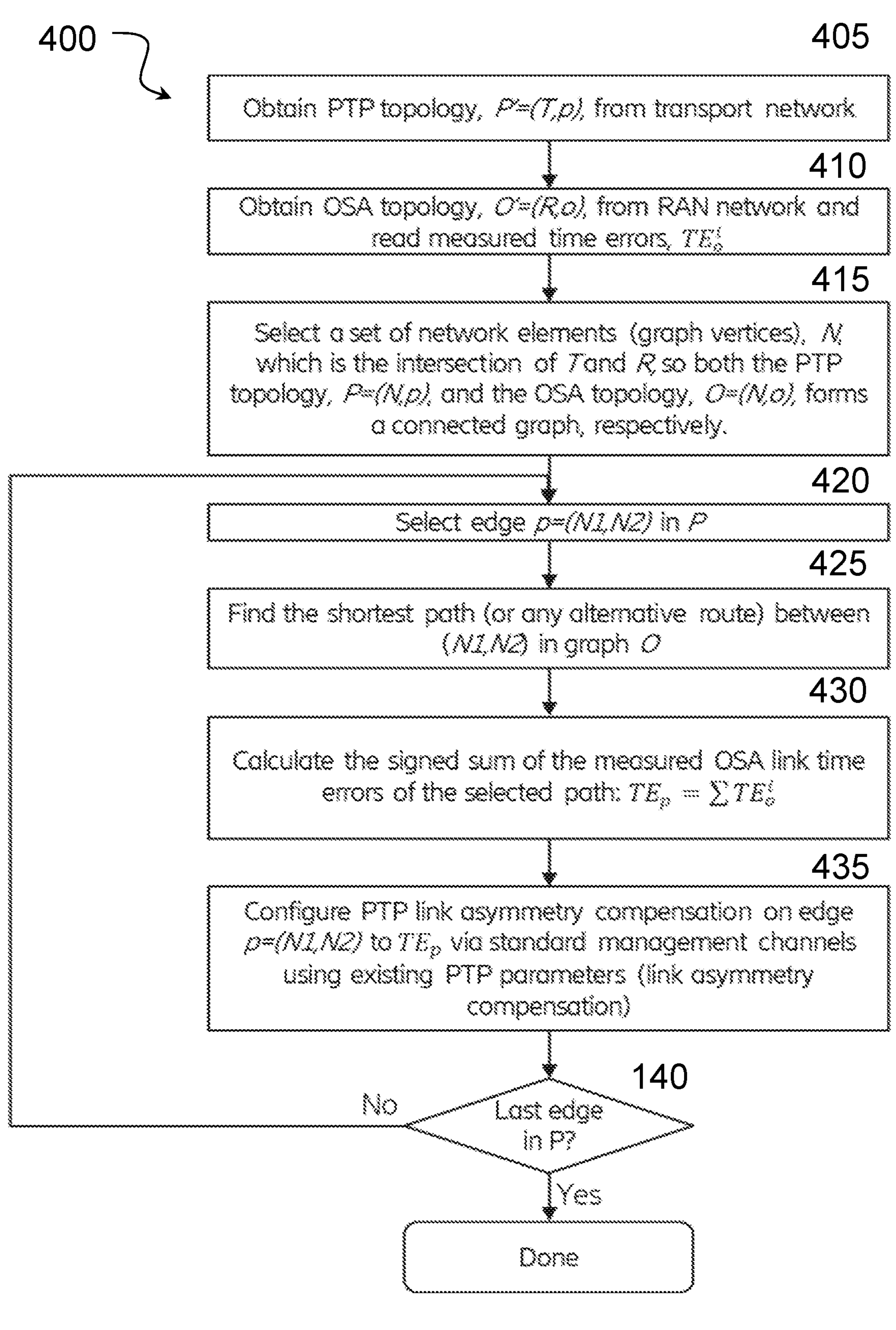
FIG. 8 illustrates an example method for calibrating asymmetry of timing protocol links such as, for example PTP links, according to certain embodiments.

FIG. 8 illustrates an example method 400 for calibrating asymmetry of timing protocol links such as, for example PTP links, according to certain embodiments. In a particular embodiment, the example method 400 may be performed by a network node operating as a central management entity such as, for exmaple, a Network Management System or other orcestrator. The method begins, at step 405, when the network node obtains a PTP topology from the network, P'=(T,p).

At step 410, the network node obtains the OAS topology from the network. The network node reads the measured relative time error values, $$TE_o^i,$$

from all the edges of graph O,O'=(R,o).

At step 415, the network node selects a set of network elements (graph vertices), N, which is the intersection of T and R so both the PTP topology, P=(N,p), and the OAS topology, O=(N,o), forms a connected graph. In a particular embodiment, all edges in P and O are assigned with a signed time error value, $TE_p$ and $TE_o$, where each $TE_o$ is measured by OAS, while $TE_p$ are unkown values that we want to calculate.

According to certain embodiments, the $TE_p$ are values unknown by the network node. Such values can be calculated in multiple ways. For example, in a particular embodiment, the unknown $TE_p$ values may be calculated as shown in FIG. 8 by selecting one of the PTP links in the PTP topology, edge p=(N1, N2) in P, at step 420. At step 425, the network node finds the shortest path (or any alternative route) between (N1,N2) in the graph of O. At step 430, the network node calculates the signed sum of the measured OAS link time errors of the selected path:

$$TE_p = \sum TE_o^i.$$

In a particular embodiment where multiple such paths exists, the mean of the path time errors may be used. At step 435, the network node configures PTP link asymmetry compensation on edge p=(N1,N2) to $TE_p$ via standard management channels using exisiting PTP parameters (link asymmetry compensation).

At step 440, the network node determines if the edge for which the PTP link assymetry calculation was performed in steps 420-435 is the last edge in P. If the edge is the last, the method terminates. However, if there is one or more additional edges in P, the network node repeats steps 420 through 435 for each edge in P.

In particular embodiments, the entire method 400 may be repeated periodically to keep track of time dependent changes in the link asymmetry.

Figure 9:
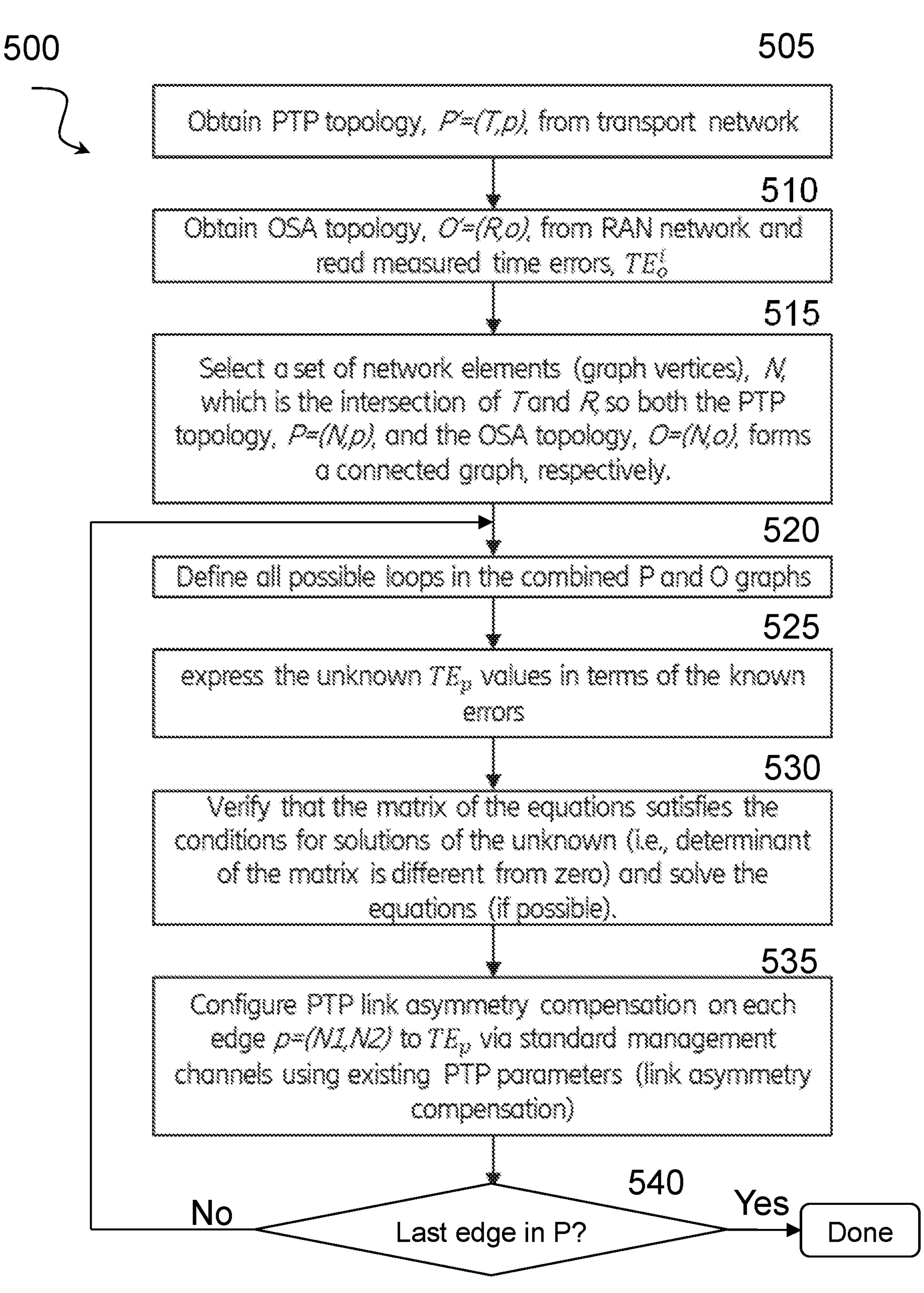
FIG. 9 illustrates another example method for calibrating asymmetry of timing protocol links such as, for example PTP links, according to certain embodiments.

FIG. 9 illustrates another example method 500 for calibrating asymmetry of timing protocol links such as, for example PTP links, according to certain embodiments. Like method 400 described above, the example method 500 may be performed by a network node operating as a central management entity such as, for exmaple, a NMS or other orcestrator. Also similar to method 400, method 500 begins, at step 505, when the network node obtains a PTP topology from the network, P'=(T,p).

At step 510, the network node obtains the OAS topology from the network. The network node reads the measured relative time error values, $$TE_o^i,$$

from all the edges of graph O,O'=(R,o).

At step 515, the network node selects a set of network elements (graph vertices), N, which is the intersection of T and R so both the PTP topology, P=(N,p), and the OAS topology, O=(N,o), forms a connected graph. In a particular embodiment, all edges in P and O are assigned with a signed time error value, $TE_p$ and $TE_o$, where each $TE_o$ is measured by OAS, while $TE_p$ are unkown values that we want to calculate.

As noted above with regard to FIG. 8, the unknown $TE_p$ values may be calculated in multiple ways. For example, in a particular embodiment, the unknown $TE_p$ values may be calculated as shown in FIG. 9 by defining all possible loops in the combined P and O graphs, at step 520.

At step 525, the network node expresses the unknown $TE_p$ values in terms of the known errors.

At step 530, the network node verifies that the matrix of the equations satisfies the conditions for solutions of the unknown (i.e., determinant of the matrix is different from zero) and solve the equations (if possible).

At step 535, the network node configures PTP link asymmetry compensation on edge p=(N1,N2) to TEp via standard management channels using existing PTP parameters (link asymmetry compensation)

At step 540, the network node determines if the edge for which the PTP link assymetry calculation was performed in steps 520-535 is the last edge in P. If the edge is the last, the method terminates. However, if there is one or more additional edges in P, the network node repeats steps 520 through 535 for each edge in P.

In particular embodiments, the entire method 500 may be repeated periodically to keep track of time dependent changes in the link asymmetry.

Figure 10:
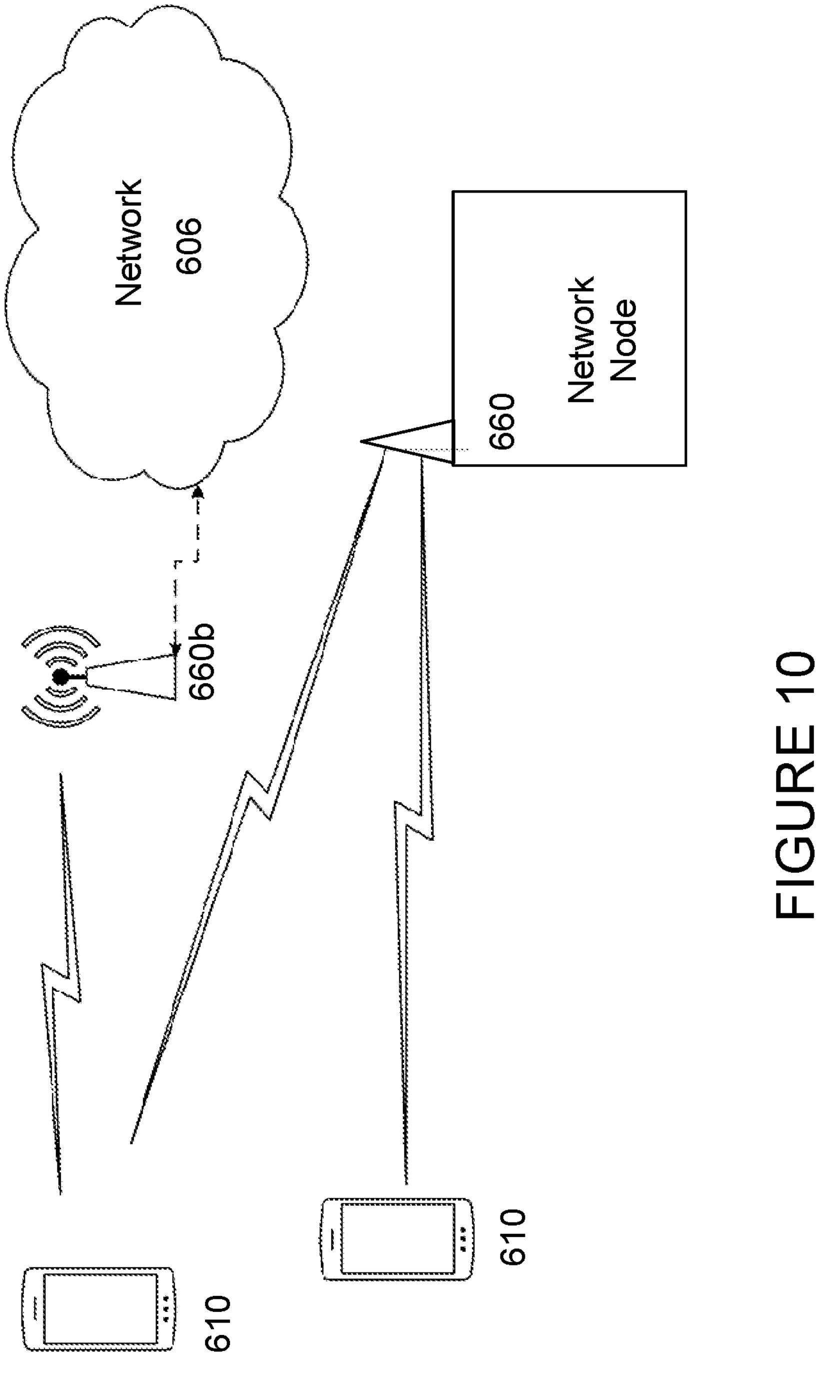
FIG. 10 illustrates an example wireless network, according to certain embodiments.

FIG. 10 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 606, network nodes 660 and 660*b*, and wireless devices 610, 610*b*, and 610*c*. In practice, a wireless network may further include any additional elements suitable to support communication between wireless devices or between a wireless device and another communication device, such as a landline telephone, a service provider, or any other network node or end device. Of the illustrated components, network node 660 and wireless device 610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 660 and wireless device 610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 11:
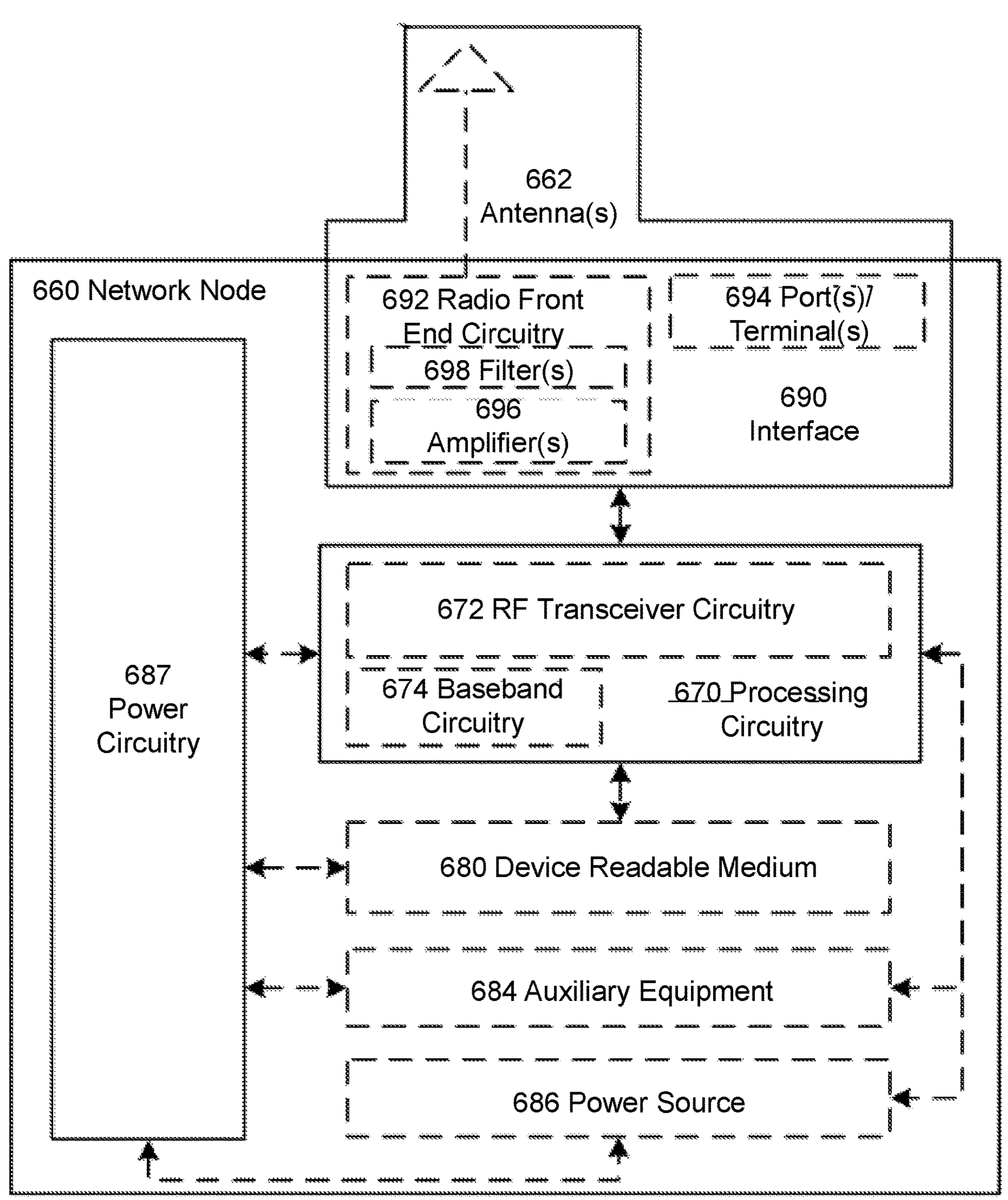
FIG. 11 illustrates an example network node, according to certain embodiments.

FIG. 11 illustrates an example network node 660, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (cNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node 660 includes processing circuitry 670, device readable medium 680, interface 690, auxiliary equipment 684, power source 686, power circuitry 687, and antenna 662. Although network node 660 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 660 are depicted as single boxes located within a larger box, or nested within multiple boxes, in practice, a network node may comprise multiple different physical components that make up a single illustrated component (e.g., device readable medium 680 may comprise multiple separate hard drives as well as multiple RAM modules).

Similarly, network node 660 may be composed of multiple physically separate components (e.g., a NodeB component and a RNC component, or a BTS component and a BSC component, etc.), which may each have their own respective components. In certain scenarios in which network node 660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 660 may be configured to support multiple radio access technologies (RATs). In such embodiments, some components may be duplicated (e.g., separate device readable medium 680 for the different RATs) and some components may be reused (e.g., the same antenna 662 may be shared by the RATs). Network node 660 may also include multiple sets of the various illustrated components for different wireless technologies integrated into network node 660, such as, for example, GSM, WCDMA, LTE, NR, WiFi, or Bluetooth wireless technologies. These wireless technologies may be integrated into the same or different chip or set of chips and other components within network node 660.

Processing circuitry 670 is configured to perform any determining, calculating, or similar operations (e.g., certain obtaining operations) described herein as being provided by a network node. These operations performed by processing circuitry 670 may include processing information obtained by processing circuitry 670 by, for example, converting the obtained information into other information, comparing the obtained information or converted information to information stored in the network node, and/or performing one or more operations based on the obtained information or converted information, and as a result of said processing making a determination.

Processing circuitry 670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 660 components, such as device readable medium 680, network node 660 functionality. For example, processing circuitry 670 may execute instructions stored in device readable medium 680 or in memory within processing circuitry 670. Such functionality may include providing any of the various wireless features, functions, or benefits discussed herein. In some embodiments, processing circuitry 670 may include a system on a chip (SOC).

In some embodiments, processing circuitry 670 may include one or more of radio frequency (RF) transceiver circuitry 672 and baseband processing circuitry 674. In some embodiments, radio frequency (RF) transceiver circuitry 672 and baseband processing circuitry 674 may be on separate chips (or sets of chips), boards, or units, such as radio units and digital units. In alternative embodiments, part or all of RF transceiver circuitry 672 and baseband processing circuitry 674 may be on the same chip or set of chips, boards, or units.

In certain embodiments, some or all of the functionality described herein as being provided by a network node, base station, eNB or other such network device may be performed by processing circuitry 670 executing instructions stored on device readable medium 680 or memory within processing circuitry 670. In alternative embodiments, some or all of the functionality may be provided by processing circuitry 670 without executing instructions stored on a separate or discrete device readable medium, such as in a hard-wired manner. In any of those embodiments, whether executing instructions stored on a device readable storage medium or not, processing circuitry 670 can be configured to perform the described functionality. The benefits provided by such functionality are not limited to processing circuitry 670 alone or to other components of network node 660 but are enjoyed by network node 660 as a whole, and/or by end users and the wireless network generally.

Device readable medium 680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 670. Device readable medium 680 may store any suitable instructions, data or information, including a computer program, software, an application including one or more of logic, rules, code, tables, etc. and/or other instructions capable of being executed by processing circuitry 670 and, utilized by network node 660. Device readable medium 680 may be used to store any calculations made by processing circuitry 670 and/or any data received via interface 690. In some embodiments, processing circuitry 670 and device readable medium 680 may be considered to be integrated.

Interface 690 is used in the wired or wireless communication of signalling and/or data between network node 660, network 606, and/or wireless devices 610. As illustrated, interface 690 comprises port(s)/terminal(s) 694 to send and receive data, for example to and from network 606 over a wired connection. Interface 690 also includes radio front end circuitry 692 that may be coupled to, or in certain embodiments a part of, antenna 662. Radio front end circuitry 692 comprises filters 698 and amplifiers 696. Radio front end circuitry 692 may be connected to antenna 662 and processing circuitry 670. Radio front end circuitry may be configured to condition signals communicated between antenna 662 and processing circuitry 670. Radio front end circuitry 692 may receive digital data that is to be sent out to other network nodes or wireless devices via a wireless connection. Radio front end circuitry 692 may convert the digital data into a radio signal having the appropriate channel and bandwidth parameters using a combination of filters 698 and/or amplifiers 696. The radio signal may then be transmitted via antenna 662. Similarly, when receiving data, antenna 662 may collect radio signals which are then converted into digital data by radio front end circuitry 692. The digital data may be passed to processing circuitry 670. In other embodiments, the interface may comprise different components and/or different combinations of components.

In certain alternative embodiments, network node 660 may not include separate radio front end circuitry 692, instead, processing circuitry 670 may comprise radio front end circuitry and may be connected to antenna 662 without separate radio front end circuitry 692. Similarly, in some embodiments, all or some of RF transceiver circuitry 672 may be considered a part of interface 690. In still other embodiments, interface 690 may include one or more ports or terminals 694, radio front end circuitry 692, and RF transceiver circuitry 672, as part of a radio unit (not shown), and interface 690 may communicate with baseband processing circuitry 674, which is part of a digital unit (not shown).

Antenna 662 may include one or more antennas, or antenna arrays, configured to send and/or receive wireless signals. Antenna 662 may be coupled to radio front end circuitry 692 and may be any type of antenna capable of transmitting and receiving data and/or signals wirelessly. In some embodiments, antenna 662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 662 may be separate from network node 660 and may be connectable to network node 660 through an interface or port.

Antenna 662, interface 690, and/or processing circuitry 670 may be configured to perform any receiving operations and/or certain obtaining operations described herein as being performed by a network node. Any information, data and/or signals may be received from a wireless device, another network node and/or any other network equipment. Similarly, antenna 662, interface 690, and/or processing circuitry 670 may be configured to perform any transmitting operations described herein as being performed by a network node. Any information, data and/or signals may be transmitted to a wireless device, another network node and/or any other network equipment.

Power circuitry 687 may comprise, or be coupled to, power management circuitry and is configured to supply the components of network node 660 with power for performing the functionality described herein. Power circuitry 687 may receive power from power source 686. Power source 686 and/or power circuitry 687 may be configured to provide power to the various components of network node 660 in a form suitable for the respective components (e.g., at a voltage and current level needed for each respective component). Power source 686 may either be included in, or external to, power circuitry 687 and/or network node 660. For example, network node 660 may be connectable to an external power source (e.g., an electricity outlet) via an input circuitry or interface such as an electrical cable, whereby the external power source supplies power to power circuitry 687. As a further example, power source 686 may comprise a source of power in the form of a battery or battery pack which is connected to, or integrated in, power circuitry 687. The battery may provide backup power should the external power source fail. Other types of power sources, such as photovoltaic devices, may also be used.

Alternative embodiments of network node 660 may include additional components beyond those shown in FIG. 11 that may be responsible for providing certain aspects of the network node's functionality, including any of the functionality described herein and/or any functionality necessary to support the subject matter described herein. For example, network node 660 may include user interface equipment to allow input of information into network node 660 and to allow output of information from network node 660. This may allow a user to perform diagnostic, maintenance, repair, and other administrative functions for network node 660.

FIG. 12 depicts a method 700 by a network node 660, according to certain embodiments. At step 705, the network node 660 determines a timing error associated with a closed loop comprising at least one radio link between two radio points. The timing error is determined based on at least one timing measurement associated with the at least one radio link. At step 710, the network node 660 adjusts timing information carried over the a timing protocol link based on the timing error associated with the closed loop comprising the at least one radio link.

In a particular embodiment, the timing protocol link comprises a PTP link.

In a particular embodiment, when determining the timing error associated with the closed loop, the network node 660 obtains a PTP network topology associated with a first set of radio points, T, that includes the at least two radio points. The network node 660 obtains an OAS network topology associated with a second set of radio points, R, that includes the at least two radio points. The network node 660 then selects a set of network elements, N, that is an intersection of the first set of radio points, T, and the second set of radio points, R. The PTP network topology and the OAS network topology form a connected graph.

In a further particular embodiment, for an edge in the PTP network topology, the network node 660 selects an edge in the PTP network topology. The edge comprising a link between the two radio points. The network node 660 determines a shortest path between the two radio points in the OAS network topology and calculates a PTP link time error for the edge based on a signed sum of the at least one timing error measurement associated with the shortest path in the OAS network between the two radio points. In a particular embodiment, the network node 660 repeats these steps for all edges in the PTP network topology.

In a particular embodiment, the network node 660 determines at least one additional path between the two radio points in the OAS network. The PTP link time error is calculated as a mean of the at least one timing error measurements associated with the shortest path and the at least one additional path. In a particular embodiment, the network node 660 repeats the these steps for all edges in the PTP network topology.

In a particular embodiment, the network node 660 defines all possible loops in the connected graph and determines at least one equation for each loop defined for the connected graph. Each one of the at least one equations expresses at least one unknown value associated with the PTP network topology in terms of the timing error determined based on at least one timing measurement associated with the at least one radio link.

In a particular embodiment, the possible loops comprises a plurality of loops, and the PTP link time error is calculated as a mean of each of the at least one unknown values expressed by the at least one equations.

In a particular embodiment, the network node 660 determines that a matrix comprised of each of the at least one equations satisfies at least one condition for a solution of the at least one unknown value associated with the PTP network topology.

In a particular embodiment, when adjusting the PTP link based on the timing error, the network node 660 configures a PTP link asymmetry compensation on at least one edge of the PTP network topology.

In a particular embodiment, the PTP network topology is obtained from a transport network. In a further particular embodiment, the transport network comprises a fronthaul transport network or an backhaul transport network.

In a particular embodiment, the OAS network topology is received from a RAN network.

In a particular embodiment, the closed loop comprises a plurality of radio links between a plurality of radio points.

In various particular embodiments, the method may additionally or alternatively include one or more of the steps or features of the embodiments described herein.

FIG. 13 illustrates a schematic block diagram of a virtual apparatus 800 in a wireless network (for example, the wireless network shown in FIG. 10). The apparatus may be implemented in a wireless device or network node (e.g., wireless device 610 or network node 660 shown in FIG. 10). Apparatus 800 is operable to carry out the example method described with reference to FIG. 12 and possibly any other processes or methods disclosed herein. It is also to be understood that the method of FIG. 12 is not necessarily carried out solely by apparatus 800. At least some operations of the method can be performed by one or more other entities.

Virtual Apparatus 800 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause determining module M10, adjusting module M20, and any other suitable units of apparatus 800 to perform corresponding functions according one or more embodiments of the present disclosure.

According to certain embodiments, determining module M10 may perform certain of the determining functions of the apparatus 800. For example, determining module M10 may determine a timing error associated with a closed loop comprising at least one radio link between two radio points. The timing error is determined based on at least one timing measurement associated with the at least one radio link.

According to certain embodiments, adjusting module M20 may perform certain of the adjusting functions of the apparatus 800. For example, adjusting module M20 may adjust timing information carried over the a timing protocol link based on the timing error associated with the closed loop comprising the at least one radio link.

Optionally, in particular embodiments, virtual apparatus may additionally include one or more modules for performing any of the steps or providing any of the features described herein.

As used herein, the term module or unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 14:
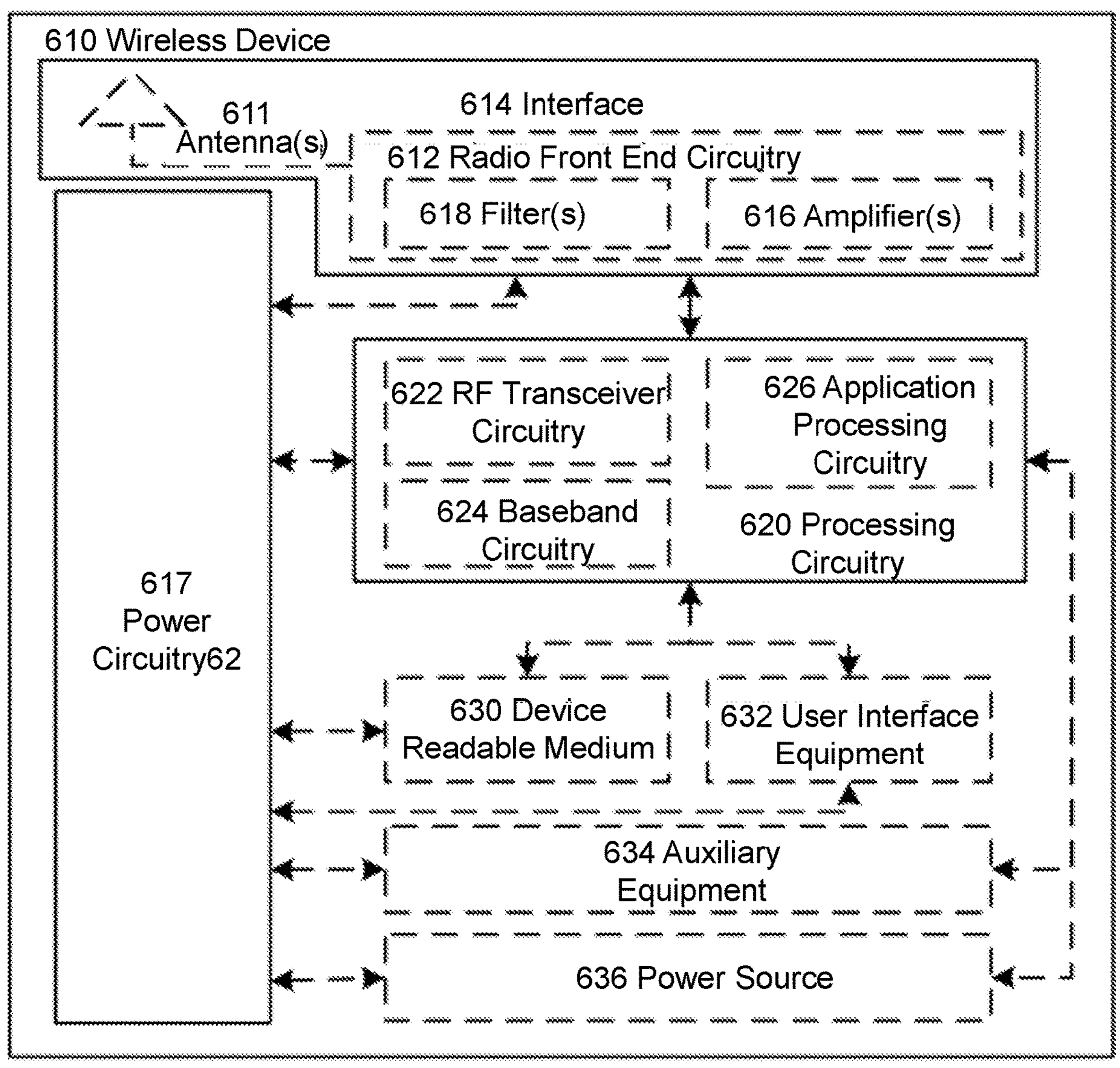
FIG. 14 illustrates an example wireless device, according to certain embodiments.

FIG. 14 illustrates an example wireless device 610. According to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 610 includes antenna 611, interface 614, processing circuitry 620, device readable medium 630, user interface equipment 632, auxiliary equipment 634, power source 636 and power circuitry 637. Wireless device 610 may include multiple sets of one or more of the illustrated components for different wireless technologies supported by wireless device 610, such as, for example, GSM, WCDMA, LTE, NR, WiFi, WiMAX, or Bluetooth wireless technologies, just to mention a few. These wireless technologies may be integrated into the same or different chips or set of chips as other components within wireless device 610.

Antenna 611 may include one or more antennas or antenna arrays, configured to send and/or receive wireless signals, and is connected to interface 614. In certain alternative embodiments, antenna 611 may be separate from wireless device 610 and be connectable to wireless device 610 through an interface or port. Antenna 611, interface 614, and/or processing circuitry 620 may be configured to perform any receiving or transmitting operations described herein as being performed by a wireless device. Any information, data and/or signals may be received from a network node and/or another wireless device. In some embodiments, radio front end circuitry and/or antenna 611 may be considered an interface.

As illustrated, interface 614 comprises radio front end circuitry 612 and antenna 611. Radio front end circuitry 612 comprise one or more filters 618 and amplifiers 616. Radio front end circuitry 612 is connected to antenna 611 and processing circuitry 620 and is configured to condition signals communicated between antenna 611 and processing circuitry 620. Radio front end circuitry 612 may be coupled to or a part of antenna 611. In some embodiments, wireless device 610 may not include separate radio front end circuitry 612; rather, processing circuitry 620 may comprise radio front end circuitry and may be connected to antenna 611. Similarly, in some embodiments, some or all of RF transceiver circuitry 622 may be considered a part of interface 614. Radio front end circuitry 612 may receive digital data that is to be sent out to other network nodes or wireless devices via a wireless connection. Radio front end circuitry 612 may convert the digital data into a radio signal having the appropriate channel and bandwidth parameters using a combination of filters 618 and/or amplifiers 616. The radio signal may then be transmitted via antenna 611. Similarly, when receiving data, antenna 611 may collect radio signals which are then converted into digital data by radio front end circuitry 612. The digital data may be passed to processing circuitry 620. In other embodiments, the interface may comprise different components and/or different combinations of components.

Processing circuitry 620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 610 components, such as device readable medium 630, wireless device 610 functionality. Such functionality may include providing any of the various wireless features or benefits discussed herein. For example, processing circuitry 620 may execute instructions stored in device readable medium 630 or in memory within processing circuitry 620 to provide the functionality disclosed herein.

As illustrated, processing circuitry 620 includes one or more of RF transceiver circuitry 622, baseband processing circuitry 624, and application processing circuitry 626. In other embodiments, the processing circuitry may comprise different components and/or different combinations of components. In certain embodiments processing circuitry 620 of wireless device 610 may comprise a SOC. In some embodiments, RF transceiver circuitry 622, baseband processing circuitry 624, and application processing circuitry 626 may be on separate chips or sets of chips. In alternative embodiments, part or all of baseband processing circuitry 624 and application processing circuitry 626 may be combined into one chip or set of chips, and RF transceiver circuitry 622 may be on a separate chip or set of chips. In still alternative embodiments, part or all of RF transceiver circuitry 622 and baseband processing circuitry 624 may be on the same chip or set of chips, and application processing circuitry 626 may be on a separate chip or set of chips. In yet other alternative embodiments, part or all of RF transceiver circuitry 622, baseband processing circuitry 624, and application processing circuitry 626 may be combined in the same chip or set of chips. In some embodiments, RF transceiver circuitry 622 may be a part of interface 614. RF transceiver circuitry 622 may condition RF signals for processing circuitry 620.

In certain embodiments, some or all of the functionality described herein as being performed by a wireless device may be provided by processing circuitry 620 executing instructions stored on device readable medium 630, which in certain embodiments may be a computer-readable storage medium. In alternative embodiments, some or all of the functionality may be provided by processing circuitry 620 without executing instructions stored on a separate or discrete device readable storage medium, such as in a hard-wired manner. In any of those particular embodiments, whether executing instructions stored on a device readable storage medium or not, processing circuitry 620 can be configured to perform the described functionality. The benefits provided by such functionality are not limited to processing circuitry 620 alone or to other components of wireless device 610, but are enjoyed by wireless device 610 as a whole, and/or by end users and the wireless network generally.

Processing circuitry 620 may be configured to perform any determining, calculating, or similar operations (e.g., certain obtaining operations) described herein as being performed by a wireless device. These operations, as performed by processing circuitry 620, may include processing information obtained by processing circuitry 620 by, for example, converting the obtained information into other information, comparing the obtained information or converted information to information stored by wireless device 610, and/or performing one or more operations based on the obtained information or converted information, and as a result of said processing making a determination.

Device readable medium 630 may be operable to store a computer program, software, an application including one or more of logic, rules, code, tables, etc. and/or other instructions capable of being executed by processing circuitry 620. Device readable medium 630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 620. In some embodiments, processing circuitry 620 and device readable medium 630 may be considered to be integrated.

User interface equipment 632 may provide components that allow for a human user to interact with wireless device 610. Such interaction may be of many forms, such as visual, audial, tactile, etc. User interface equipment 632 may be operable to produce output to the user and to allow the user to provide input to wireless device 610. The type of interaction may vary depending on the type of user interface equipment 632 installed in wireless device 610. For example, if wireless device 610 is a smart phone, the interaction may be via a touch screen; if wireless device 610 is a smart meter, the interaction may be through a screen that provides usage (e.g., the number of gallons used) or a speaker that provides an audible alert (e.g., if smoke is detected). User interface equipment 632 may include input interfaces, devices and circuits, and output interfaces, devices and circuits. User interface equipment 632 is configured to allow input of information into wireless device 610 and is connected to processing circuitry 620 to allow processing circuitry 620 to process the input information. User interface equipment 632 may include, for example, a microphone, a proximity or other sensor, keys/buttons, a touch display, one or more cameras, a USB port, or other input circuitry. User interface equipment 632 is also configured to allow output of information from wireless device 610, and to allow processing circuitry 620 to output information from wireless device 610. User interface equipment 632 may include, for example, a speaker, a display, vibrating circuitry, a USB port, a headphone interface, or other output circuitry. Using one or more input and output interfaces, devices, and circuits, of user interface equipment 632, wireless device 610 may communicate with end users and/or the wireless network and allow them to benefit from the functionality described herein.

Auxiliary equipment 634 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 634 may vary depending on the embodiment and/or scenario.

Power source 636 may, in some embodiments, be in the form of a battery or battery pack. Other types of power sources, such as an external power source (e.g., an electricity outlet), photovoltaic devices or power cells, may also be used. wireless device 610 may further comprise power circuitry 637 for delivering power from power source 636 to the various parts of wireless device 610 which need power from power source 636 to carry out any functionality described or indicated herein. Power circuitry 637 may in certain embodiments comprise power management circuitry. Power circuitry 637 may additionally or alternatively be operable to receive power from an external power source; in which case wireless device 610 may be connectable to the external power source (such as an electricity outlet) via input circuitry or an interface such as an electrical power cable. Power circuitry 637 may also in certain embodiments be operable to deliver power from an external power source to power source 636. This may be, for example, for the charging of power source 636. Power circuitry 637 may perform any formatting, converting, or other modification to the power from power source 636 to make the power suitable for the respective components of wireless device 610 to which power is supplied.

Figure 15:
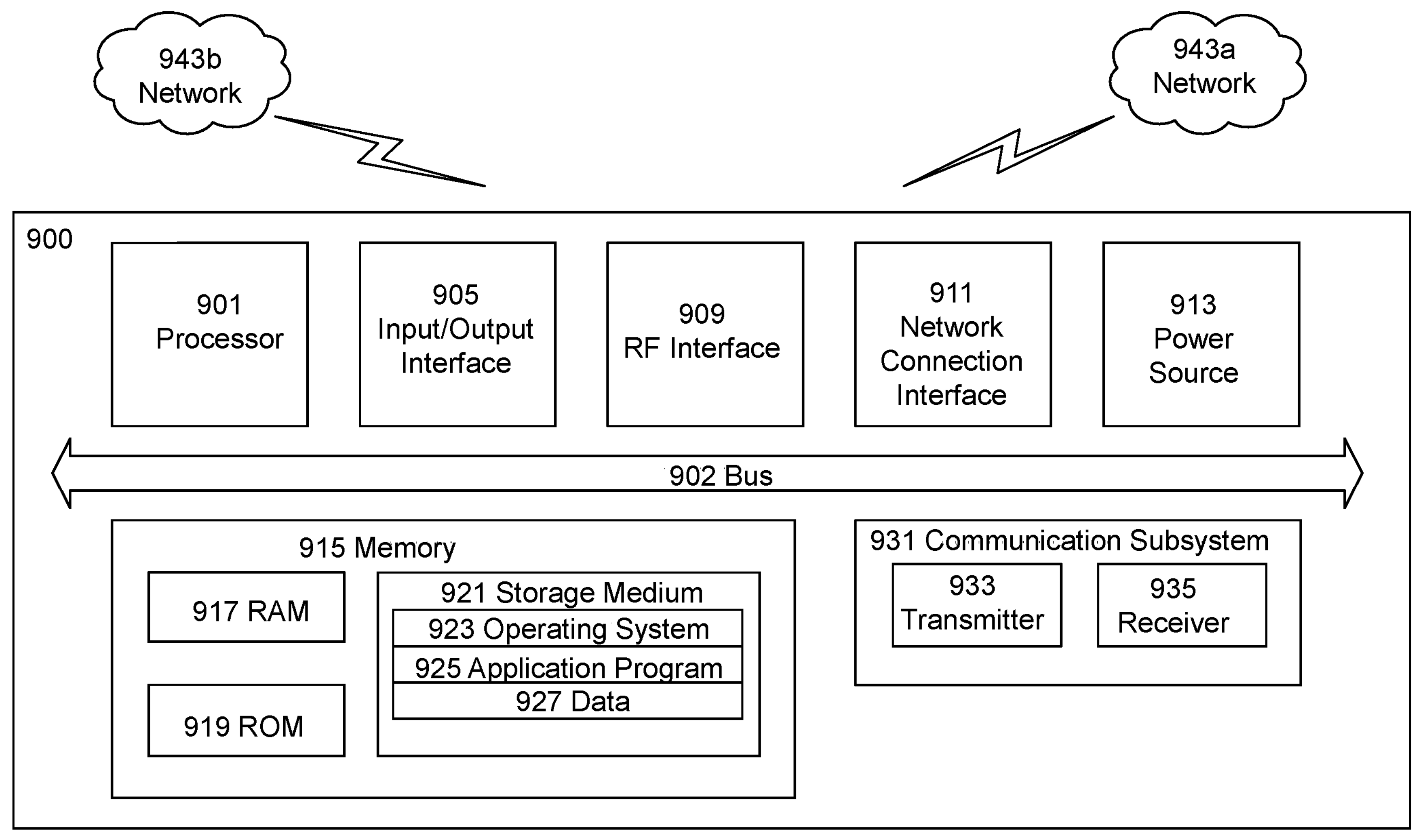
FIG. 15 illustrate an example user equipment, according to certain embodiments.

FIG. 15 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 900 may be any UE identified by the 3$^{rd}$ Generation Partnership Project (3GPP), including a NB-IoT UE, a machine type communication (MTC) UE, and/or an enhanced MTC (eMTC) UE. UE 900, as illustrated in FIG. 11, is one example of a wireless device configured for communication in accordance with one or more communication standards promulgated by the 3$^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 15 is a UE, the components discussed herein are equally applicable to a wireless device, and vice-versa.

In FIG. 15, UE 900 includes processing circuitry 901 that is operatively coupled to input/output interface 905, radio frequency (RF) interface 909, network connection interface 911, memory 915 including random access memory (RAM) 917, read-only memory (ROM) 919, and storage medium 921 or the like, communication subsystem 931, power source 933, and/or any other component, or any combination thereof. Storage medium 921 includes operating system 923, application program 925, and data 927. In other embodiments, storage medium 921 may include other similar types of information. Certain UEs may utilize all of the components shown in FIG. 15, or only a subset of the components. The level of integration between the components may vary from one UE to another UE. Further, certain UEs may contain multiple instances of a component, such as multiple processors, memories, transceivers, transmitters, receivers, etc.

In FIG. 15, processing circuitry 901 may be configured to process computer instructions and data. Processing circuitry 901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 901 may include two central processing units (CPUs). Data may be information in a form suitable for use by a computer.

In the depicted embodiment, input/output interface 905 may be configured to provide a communication interface to an input device, output device, or input and output device. UE 900 may be configured to use an output device via input/output interface 905. An output device may use the same type of interface port as an input device. For example, a USB port may be used to provide input to and output from UE 900. The output device may be a speaker, a sound card, a video card, a display, a monitor, a printer, an actuator, an emitter, a smartcard, another output device, or any combination thereof. UE 900 may be configured to use an input device via input/output interface 905 to allow a user to capture information into UE 900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 15, RF interface 909 may be configured to provide a communication interface to RF components such as a transmitter, a receiver, and an antenna. Network connection interface 911 may be configured to provide a communication interface to network **943*a*. Network 943*a* may encompass wired and/or wireless networks such as a local-area network (LAN), a wide-area network (WAN), a computer network, a wireless network, a telecommunications network, another like network or any combination thereof. For example, network 943*a* may comprise a Wi-Fi network. Network connection interface 911 may be configured to include a receiver and a transmitter interface used to communicate with one or more other devices over a communication network according to one or more communication protocols, such as Ethernet, TCP/IP, SONET, ATM, or the like. Network connection interface 911** may implement receiver and transmitter functionality appropriate to the communication network links (e.g., optical, electrical, and the like). The transmitter and receiver functions may share circuit components, software or firmware, or alternatively may be implemented separately.

RAM 917 may be configured to interface via bus 902 to processing circuitry 901 to provide storage or caching of data or computer instructions during the execution of software programs such as the operating system, application programs, and device drivers. ROM 919 may be configured to provide computer instructions or data to processing circuitry 901. For example, ROM 919 may be configured to store invariant low-level system code or data for basic system functions such as basic input and output (I/O), startup, or reception of keystrokes from a keyboard that are stored in a non-volatile memory. Storage medium 921 may be configured to include memory such as RAM, ROM, programmable read-only memory (PROM), crasable programmable read-only memory (EPROM), electrically erasable programmable read-only memory (EEPROM), magnetic disks, optical disks, floppy disks, hard disks, removable cartridges, or flash drives. In one example, storage medium 921 may be configured to include operating system 923, application program 925 such as a web browser application, a widget or gadget engine or another application, and data file 927. Storage medium 921 may store, for use by UE 900, any of a variety of various operating systems or combinations of operating systems.

Storage medium 921 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 921 may allow UE 900 to access computer-executable instructions, application programs or the like, stored on transitory or non-transitory memory media, to off-load data, or to upload data. An article of manufacture, such as one utilizing a communication system may be tangibly embodied in storage medium 921, which may comprise a device readable medium.

In FIG. 15, processing circuitry 901 may be configured to communicate with network **943*b* using communication subsystem 931. Network 943*a* and network 943*b* may be the same network or networks or different network or networks. Communication subsystem 931 may be configured to include one or more transceivers used to communicate with network 943*b*. For example, communication subsystem 931 may be configured to include one or more transceivers used to communicate with one or more remote transceivers of another device capable of wireless communication such as another wireless device, UE, or base station of a radio access network (RAN) according to one or more communication protocols, such as IEEE 802.9, CDMA, WCDMA, GSM, LTE, UTRAN, WiMax, or the like. Each transceiver may include transmitter 933 and/or receiver 935 to implement transmitter or receiver functionality, respectively, appropriate to the RAN links (e.g., frequency allocations and the like). Further, transmitter 933 and receiver 935** of each transceiver may share circuit components, software or firmware, or alternatively may be implemented separately.

In the illustrated embodiment, the communication functions of communication subsystem 931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 931 may include cellular communication, Wi-Fi communication, Bluetooth communication, and GPS communication. Network **943*b* may encompass wired and/or wireless networks such as a local-area network (LAN), a wide-area network (WAN), a computer network, a wireless network, a telecommunications network, another like network or any combination thereof. For example, network 943*b* may be a cellular network, a Wi-Fi network, and/or a near-field network. Power source 913 may be configured to provide alternating current (AC) or direct current (DC) power to components of UE 900**.

The features, benefits and/or functions described herein may be implemented in one of the components of UE 900 or partitioned across multiple components of UE 900. Further, the features, benefits, and/or functions described herein may be implemented in any combination of hardware, software or firmware. In one example, communication subsystem 931 may be configured to include any of the components described herein. Further, processing circuitry 901 may be configured to communicate with any of such components over bus 902. In another example, any of such components may be represented by program instructions stored in memory that when executed by processing circuitry 901 perform the corresponding functions described herein. In another example, the functionality of any of such components may be partitioned between processing circuitry 901 and communication subsystem 931. In another example, the non-computationally intensive functions of any of such components may be implemented in software or firmware and the computationally intensive functions may be implemented in hardware.

Figure 16:
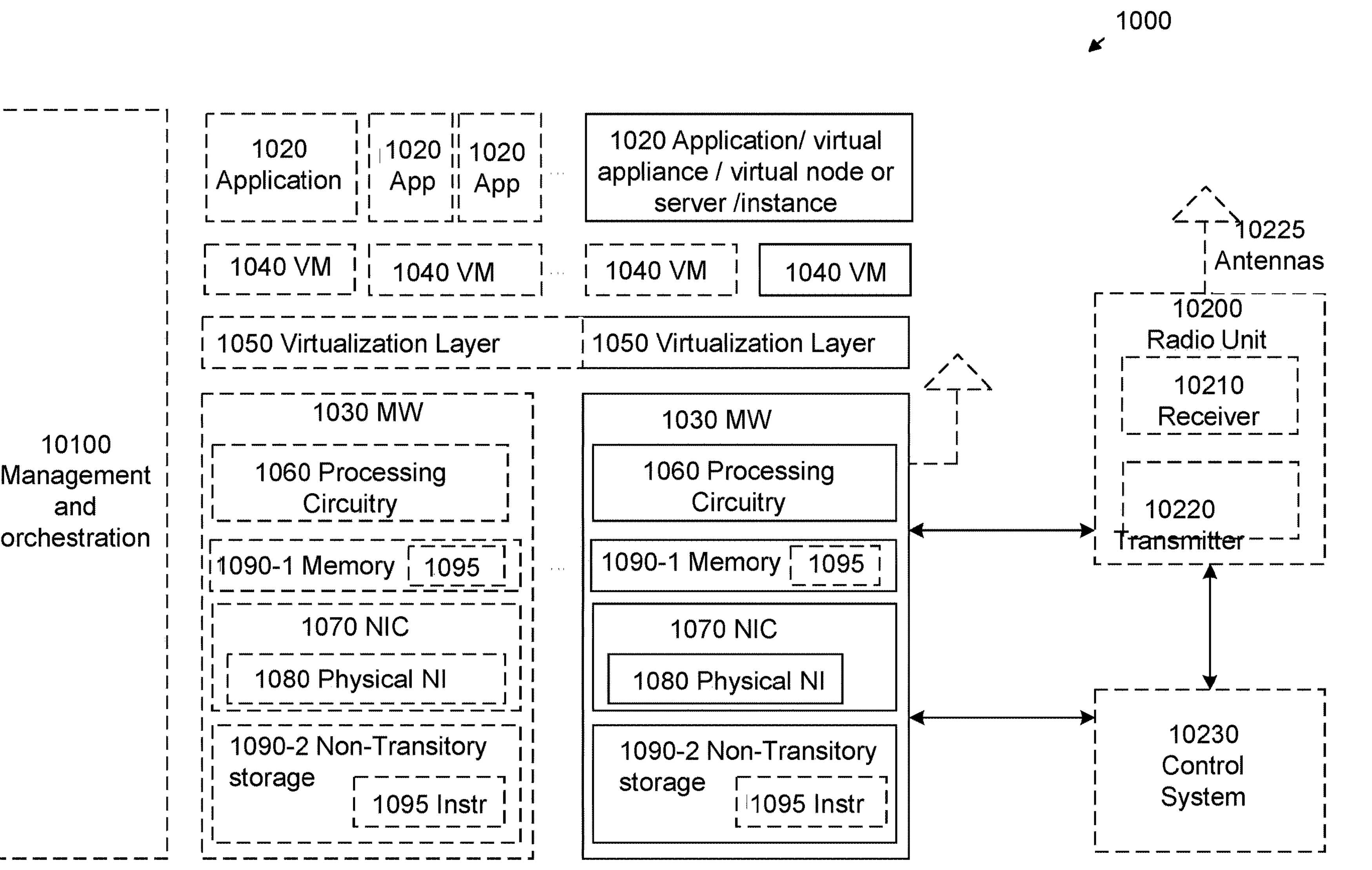
FIG. 16 illustrates a virtualization environment in which functions implemented by some embodiments may be virtualized, according to certain embodiments.

FIG. 16 is a schematic block diagram illustrating a virtualization environment 1000 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1000 hosted by one or more of hardware nodes 1030. Further, in embodiments in which the virtual node is not a radio access node or does not require radio connectivity (e.g., a core network node), then the network node may be entirely virtualized.

The functions may be implemented by one or more applications 1020 (which may alternatively be called software instances, virtual appliances, network functions, virtual nodes, virtual network functions, etc.) operative to implement some of the features, functions, and/or benefits of some of the embodiments disclosed herein. Applications 1020 are run in virtualization environment 1000 which provides hardware 1030 comprising processing circuitry 1060 and memory 1090. Memory 1090 contains instructions 1095 executable by processing circuitry 1060 whereby application 1020 is operative to provide one or more of the features, benefits, and/or functions disclosed herein.

Virtualization environment 1000, comprises general-purpose or special-purpose network hardware devices 1030 comprising a set of one or more processors or processing circuitry 1060, which may be commercial off-the-shelf (COTS) processors, dedicated Application Specific Integrated Circuits (ASICs), or any other type of processing circuitry including digital or analog hardware components or special purpose processors. Each hardware device may comprise memory 1090-1 which may be non-persistent memory for temporarily storing instructions 1095 or software executed by processing circuitry 1060. Each hardware device may comprise one or more network interface controllers (NICs) 1070, also known as network interface cards, which include physical network interface 1080. Each hardware device may also include non-transitory, persistent, machine-readable storage media 1090-2 having stored therein software 1095 and/or instructions executable by processing circuitry 1060. Software 1095 may include any type of software including software for instantiating one or more virtualization layers 1050 (also referred to as hypervisors), software to execute virtual machines 1040 as well as software allowing it to execute functions, features and/or benefits described in relation with some embodiments described herein.

Virtual machines 1040, comprise virtual processing, virtual memory, virtual networking or interface and virtual storage, and may be run by a corresponding virtualization layer 1050 or hypervisor. Different embodiments of the instance of virtual appliance 1020 may be implemented on one or more of virtual machines 1040, and the implementations may be made in different ways.

During operation, processing circuitry 1060 executes software 1095 to instantiate the hypervisor or virtualization layer 1050, which may sometimes be referred to as a virtual machine monitor (VMM). Virtualization layer 1050 may present a virtual operating platform that appears like networking hardware to virtual machine 1040.

As shown in FIG. 16, hardware 1030 may be a standalone network node with generic or specific components. Hardware 1030 may comprise antenna 10225 and may implement some functions via virtualization. Alternatively, hardware 1030 may be part of a larger cluster of hardware (e.g. such as in a data center or customer premise equipment (CPE)) where many hardware nodes work together and are managed via management and orchestration (MANO) 10100, which, among others, oversees lifecycle management of applications 1020.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1040 may be a software implementation of a physical machine that runs programs as if they were executing on a physical, non-virtualized machine. Each of virtual machines 1040, and that part of hardware 1030 that executes that virtual machine, be it hardware dedicated to that virtual machine and/or hardware shared by that virtual machine with others of the virtual machines 1040, forms a separate virtual network elements (VNE).

Still in the context of NFV, Virtual Network Function (VNF) is responsible for handling specific network functions that run in one or more virtual machines 1040 on top of hardware networking infrastructure 1030 and corresponds to application 1020 in FIG. 16.

In some embodiments, one or more radio units 10200 that each include one or more transmitters 10220 and one or more receivers 10210 may be coupled to one or more antennas 10225. Radio units 10200 may communicate directly with hardware nodes 1030 via one or more appropriate network interfaces and may be used in combination with the virtual components to provide a virtual node with radio capabilities, such as a radio access node or a base station.

In some embodiments, some signaling can be affected with the use of control system 10230 which may alternatively be used for communication between the hardware nodes 1030 and radio units 10200.

Figure 17:
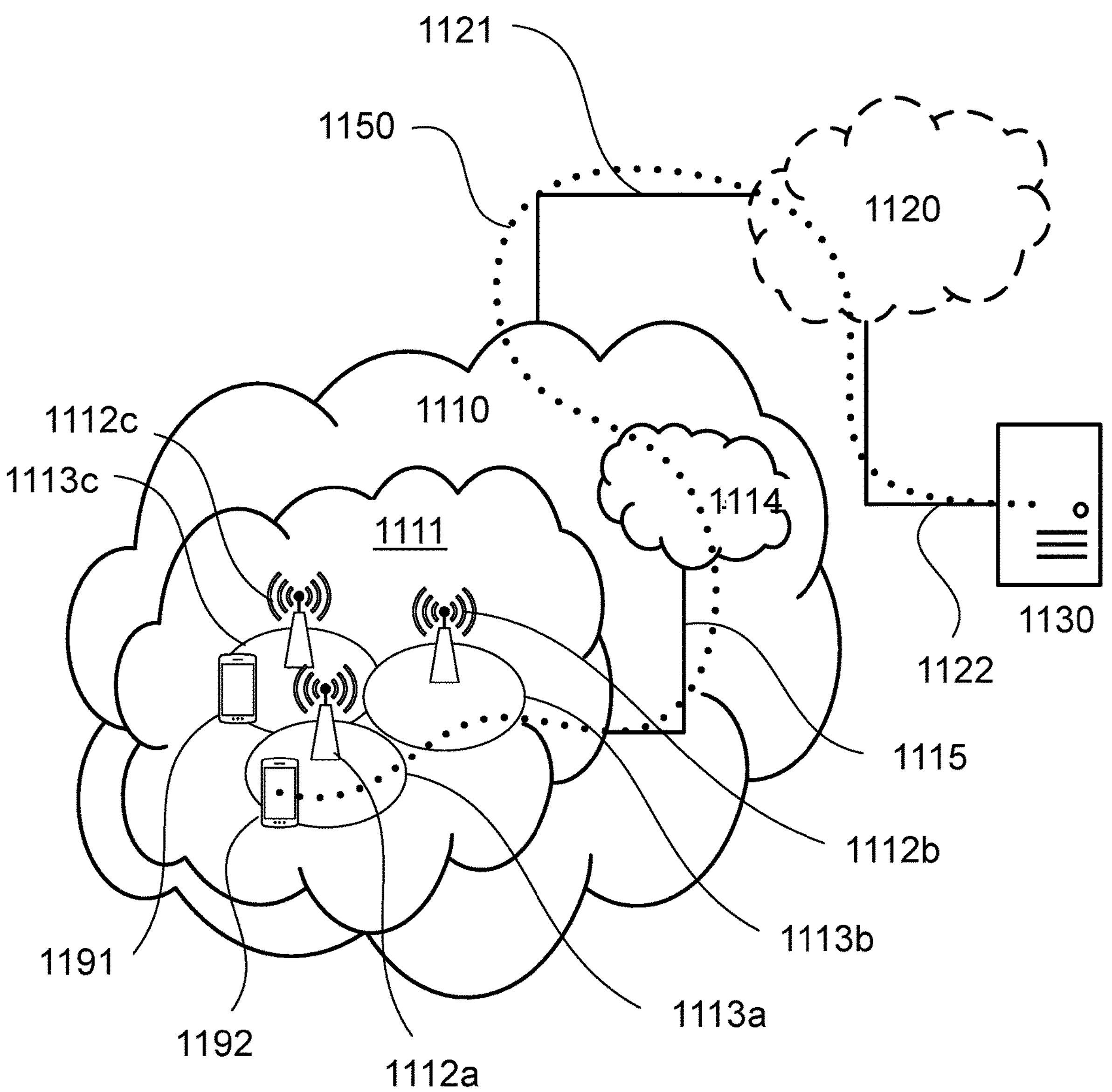
FIG. 17 illustrates a telecommunication network connected via an intermediate network to a host computer, according to certain embodiments.

FIG. 17 illustrates a telecommunication network connected via an intermediate network to a host computer in accordance with some embodiments.

With reference to FIG. 17, in accordance with an embodiment, a communication system includes telecommunication network 1110, such as a 3GPP-type cellular network, which comprises access network 1111, such as a radio access network, and core network 1114. Access network 1111 comprises a plurality of base stations 1112*a*, 1112*b*, 1112*c*, such as NBs, eNBs, gNBs or other types of wireless access points, each defining a corresponding coverage area 1113*a*, 1113*b*, 1113*c*. Each base station 1112*a*, 1112*b*, 1112*c* is connectable to core network 1114 over a wired or wireless connection 1115. A first UE 1191 located in coverage area 1113*c* is configured to wirelessly connect to, or be paged by, the corresponding base station 1112*c*. A second UE 1192 in coverage area 1113*a* is wirelessly connectable to the corresponding base station 1112*a*. While a plurality of UEs 1191, 1192 are illustrated in this example, the disclosed embodiments are equally applicable to a situation where a sole UE is in the coverage area or where a sole UE is connecting to the corresponding base station 1112.

Telecommunication network 1110 is itself connected to host computer 1130, which may be embodied in the hardware and/or software of a standalone server, a cloud-implemented server, a distributed server or as processing resources in a server farm. Host computer 1130 may be under the ownership or control of a service provider or may be operated by the service provider or on behalf of the service provider. Connections 1121 and 1122 between telecommunication network 1110 and host computer 1130 may extend directly from core network 1114 to host computer 1130 or may go via an optional intermediate network 1120. Intermediate network 1120 may be one of, or a combination of more than one of, a public, private or hosted network; intermediate network 1120, if any, may be a backbone network or the Internet; in particular, intermediate network 1120 may comprise two or more sub-networks (not shown).

The communication system of FIG. 17 as a whole enables connectivity between the connected UEs 1191, 1192 and host computer 1130. The connectivity may be described as an over-the-top (OTT) connection 1150. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 may be transparent in the sense that the participating communication devices through which OTT connection 1150 passes are unaware of routing of uplink and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing uplink communication originating from the UE 1191 towards the host computer 1130.

Figure 18:
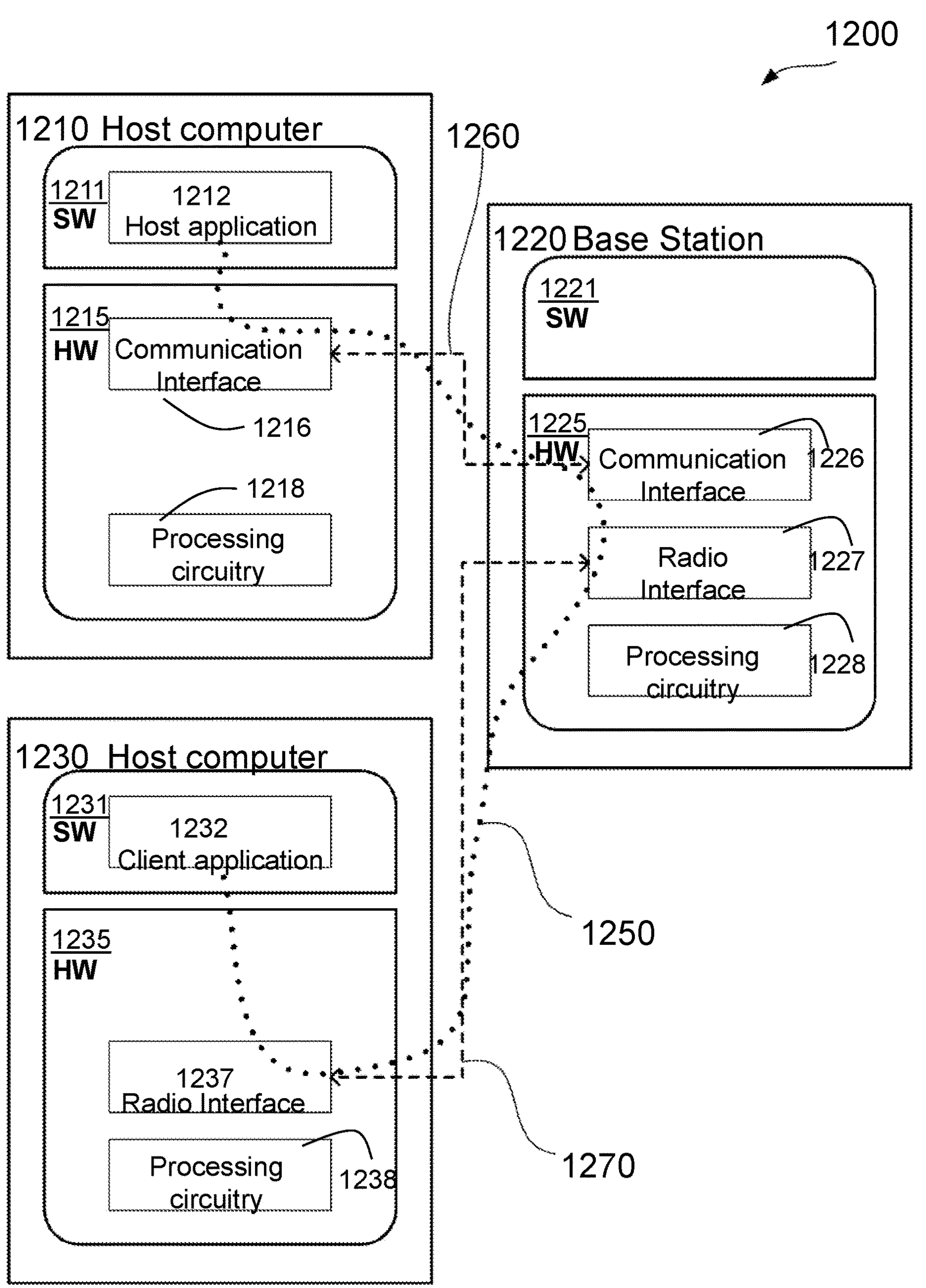
FIG. 18 illustrates a generalized block diagram of a host computer communicating via a base station with a user equipment over a partially wireless connection, according to certain embodiments.

FIG. 18 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 18. In communication system 1200, host computer 1210 comprises hardware 1215 including communication interface 1216 configured to set up and maintain a wired or wireless connection with an interface of a different communication device of communication system 1200. Host computer 1210 further comprises processing circuitry 1218, which may have storage and/or processing capabilities. In particular, processing circuitry 1218 may comprise one or more programmable processors, application-specific integrated circuits, field programmable gate arrays or combinations of these (not shown) adapted to execute instructions. Host computer 1210 further comprises software 1211, which is stored in or accessible by host computer 1210 and executable by processing circuitry 1218. Software 1211 includes host application 1212. Host application 1212 may be operable to provide a service to a remote user, such as UE 1230 connecting via OTT connection 1250 terminating at UE 1230 and host computer 1210. In providing the service to the remote user, host application 1212 may provide user data which is transmitted using OTT connection 1250.

Communication system 1200 further includes base station 1220 provided in a telecommunication system and comprising hardware 1225 enabling it to communicate with host computer 1210 and with UE 1230. Hardware 1225 may include communication interface 1226 for setting up and maintaining a wired or wireless connection with an interface of a different communication device of communication system 1200, as well as radio interface 1227 for setting up and maintaining at least wireless connection 1270 with UE 1230 located in a coverage area (not shown in FIG. 18) served by base station 1220. Communication interface 1226 may be configured to facilitate connection 1260 to host computer 1210. Connection 1260 may be direct or it may pass through a core network (not shown in FIG. 18) of the telecommunication system and/or through one or more intermediate networks outside the telecommunication system. In the embodiment shown, hardware 1225 of base station 1220 further includes processing circuitry 1228, which may comprise one or more programmable processors, application-specific integrated circuits, field programmable gate arrays or combinations of these (not shown) adapted to execute instructions. Base station 1220 further has software 1221 stored internally or accessible via an external connection.

Communication system 1200 further includes UE 1230 already referred to. Its hardware 1235 may include radio interface 1237 configured to set up and maintain wireless connection 1270 with a base station serving a coverage area in which UE 1230 is currently located. Hardware 1235 of UE 1230 further includes processing circuitry 1238, which may comprise one or more programmable processors, application-specific integrated circuits, field programmable gate arrays or combinations of these (not shown) adapted to execute instructions. UE 1230 further comprises software 1231, which is stored in or accessible by UE 1230 and executable by processing circuitry 1238. Software 1231 includes client application 1232. Client application 1232 may be operable to provide a service to a human or non-human user via UE 1230, with the support of host computer 1210. In host computer 1210, an executing host application 1212 may communicate with the executing client application 1232 via OTT connection 1250 terminating at UE 1230 and host computer 1210. In providing the service to the user, client application 1232 may receive request data from host application 1212 and provide user data in response to the request data. OTT connection 1250 may transfer both the request data and the user data. Client application 1232 may interact with the user to generate the user data that it provides.

It is noted that host computer 1210, base station 1220 and UE 1230 illustrated in FIG. 18 may be similar or identical to host computer 1130, one of base stations 1112*a*, 1112*b*, 1112*c* and one of UEs 1191, 1192 of FIG. 17, respectively. This is to say, the inner workings of these entities may be as shown in FIG. 18 and independently, the surrounding network topology may be that of FIG. 17.

In FIG. 18, OTT connection 1250 has been drawn abstractly to illustrate the communication between host computer 1210 and UE 1230 via base station 1220, without explicit reference to any intermediary devices and the precise routing of messages via these devices. Network infrastructure may determine the routing, which it may be configured to hide from UE 1230 or from the service provider operating host computer 1210, or both. While OTT connection 1250 is active, the network infrastructure may further take decisions by which it dynamically changes the routing (e.g., on the basis of load balancing consideration or reconfiguration of the network).

Wireless connection 1270 between UE 1230 and base station 1220 is in accordance with the teachings of the embodiments described throughout this disclosure. One or more of the various embodiments improve the performance of OTT services provided to UE 1230 using OTT connection 1250, in which wireless connection 1270 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 1250 between host computer 1210 and UE 1230, in response to variations in the measurement results. The measurement procedure and/or the network functionality for reconfiguring OTT connection 1250 may be implemented in software 1211 and hardware 1215 of host computer 1210 or in software 1231 and hardware 1235 of UE 1230, or both. In embodiments, sensors (not shown) may be deployed in or in association with communication devices through which OTT connection 1250 passes; the sensors may participate in the measurement procedure by supplying values of the monitored quantities exemplified above or supplying values of other physical quantities from which software 1211, 1231 may compute or estimate the monitored quantities. The reconfiguring of OTT connection 1250 may include message format, retransmission settings, preferred routing etc.; the reconfiguring need not affect base station 1220, and it may be unknown or imperceptible to base station 1220. Such procedures and functionalities may be known and practiced in the art. In certain embodiments, measurements may involve proprietary UE signaling facilitating host computer 1210's measurements of throughput, propagation times, latency and the like. The measurements may be implemented in that software 1211 and 1231 causes messages to be transmitted, in particular empty or 'dummy' messages, using OTT connection 1250 while it monitors propagation times, errors etc.

Figures 19, 20:
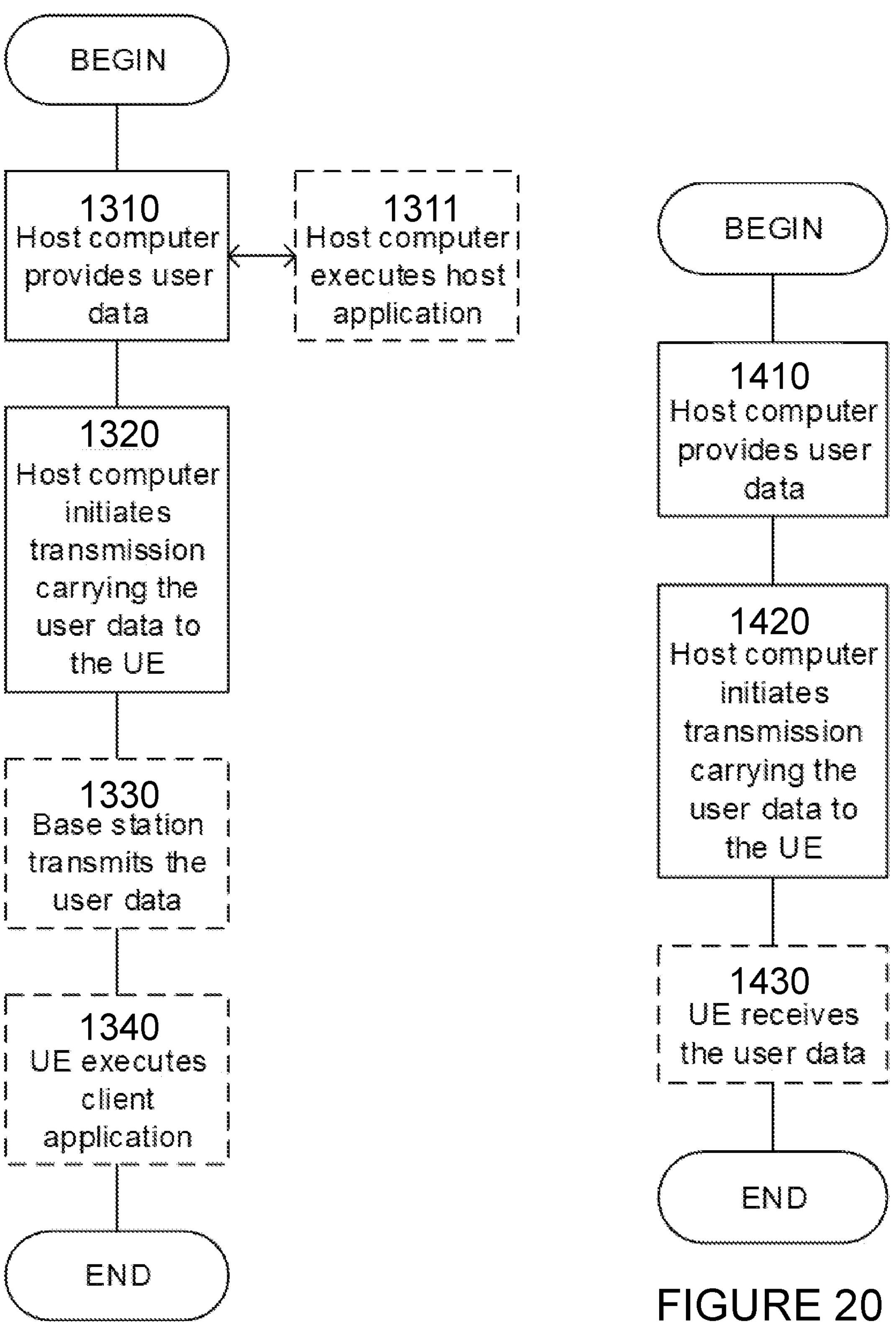
FIG. 19 illustrates a method implemented in a communication system, according to one embodiment.
FIG. 20 illustrates another method implemented in a communication system, according to one embodiment.

FIG. 19 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 19 will be included in this section. In step 1310, the host computer provides user data. In substep 1311 (which may be optional) of step 1310, the host computer provides the user data by executing a host application. In step 1320, the host computer initiates a transmission carrying the user data to the UE. In step 1330 (which may be optional), the base station transmits to the UE the user data which was carried in the transmission that the host computer initiated, in accordance with the teachings of the embodiments described throughout this disclosure. In step 1340 (which may also be optional), the UE executes a client application associated with the host application executed by the host computer.

FIG. 20 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 20 will be included in this section. In step 1410 of the method, the host computer provides user data. In an optional substep (not shown) the host computer provides the user data by executing a host application. In step 1420, the host computer initiates a transmission carrying the user data to the UE. The transmission may pass via the base station, in accordance with the teachings of the embodiments described throughout this disclosure. In step 1430 (which may be optional), the UE receives the user data carried in the transmission.

Figures 21, 22:
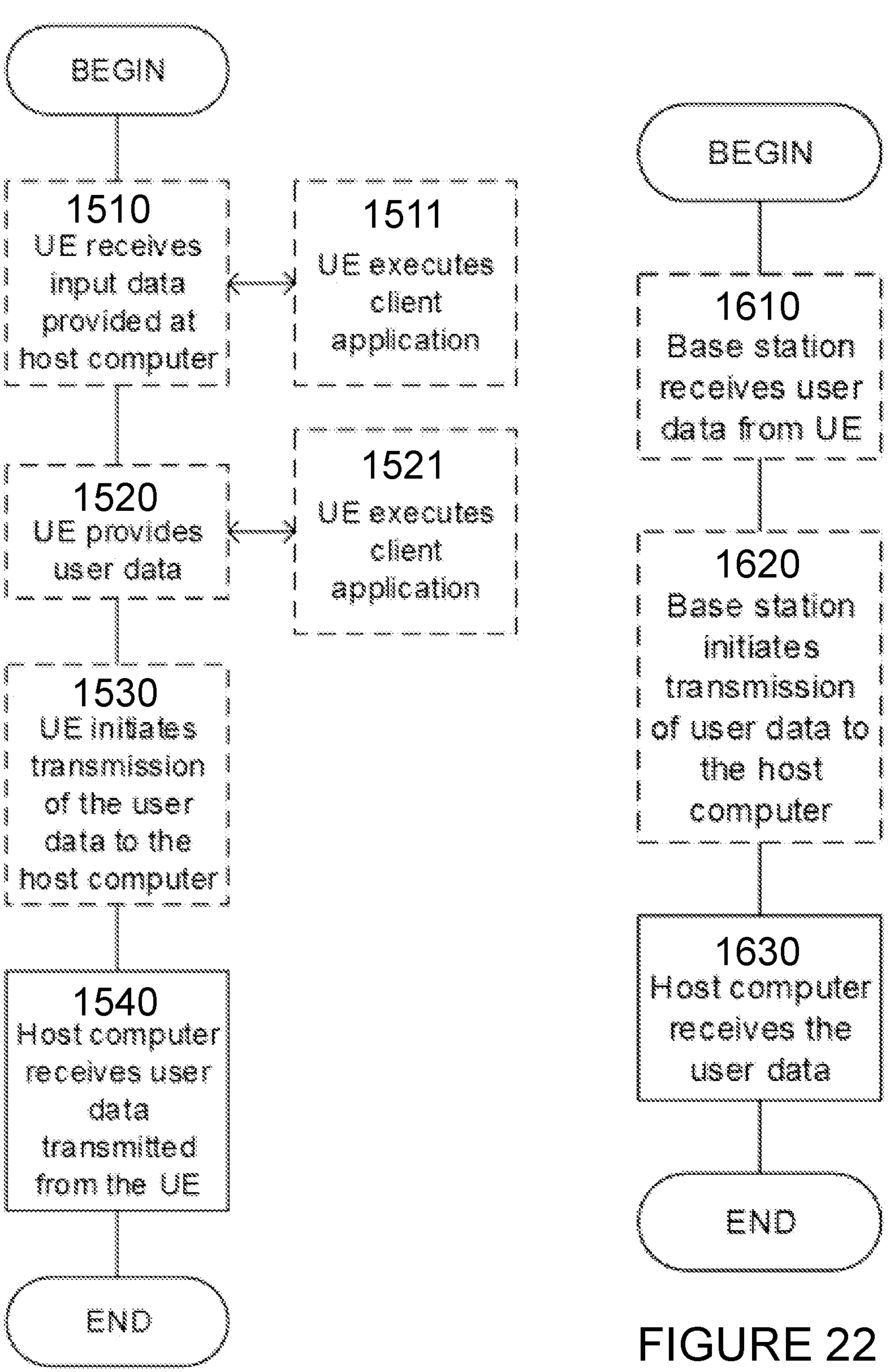
FIG. 21 illustrates another method implemented in a communication system, according to one embodiment.
FIG. 22 illustrates another method implemented in a communication system, according to one embodiment.

FIG. 21 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 21 will be included in this section. In step 1510 (which may be optional), the UE receives input data provided by the host computer. Additionally or alternatively, in step 1520, the UE provides user data. In substep 1521 (which may be optional) of step 1520, the UE provides the user data by executing a client application. In substep 1511 (which may be optional) of step 1510, the UE executes a client application which provides the user data in reaction to the received input data provided by the host computer. In providing the user data, the executed client application may further consider user input received from the user. Regardless of the specific manner in which the user data was provided, the UE initiates, in substep 1530 (which may be optional), transmission of the user data to the host computer. In step 1540 of the method, the host computer receives the user data transmitted from the UE, in accordance with the teachings of the embodiments described throughout this disclosure.

FIG. 22 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 22 will be included in this section. In step 1610 (which may be optional), in accordance with the teachings of the embodiments described throughout this disclosure, the base station receives user data from the UE. In step 1620 (which may be optional), the base station initiates transmission of the received user data to the host computer. In step 1630 (which may be optional), the host computer receives the user data carried in the transmission initiated by the base station.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1× RTT CDMA2000 1× Radio Transmission Technology
3GPP 3rd Generation Partnership Project
5G 5th Generation
5GS 5G System
5QI 5G QoS Identifier
ABS Almost Blank Subframe
AN Access Network
AN Access Node
ANR Automatic Neighbor Relations
AP Access Point
ARQ Automatic Repeat Request
AS Access Stratum
AWGN Additive White Gaussian Noise
BCCH Broadcast Control Channel
BCH Broadcast Channel
BLER Block Error Rate
BS Base Station
BSC Base Station Controller
BTS Base Transceiver Station
CA Carrier Aggregation
CC Carrier Component
CCCH SDU Common Control Channel SDU
CDMA Code Division Multiplexing Access
CG Cell Group
CGI Cell Global Identifier/Identity
CIR Channel Impulse Response
CN Core Network
CP Cyclic Prefix
CPICH Common Pilot Channel
CPICH Ec/No CPICH Received energy per chip divided by the power density in the band
CQI Channel Quality information
C-RAN Centralized RAN
C-RNTI Cell RNTI
CSI Channel State Information
DCCH Dedicated Control Channel
DL Downlink
DL-SCH Downlink Shared Channel
DM Demodulation
DMRS Demodulation Reference Signal
DRX Discontinuous Reception
DTX Discontinuous Transmission
DTCH Dedicated Traffic Channel DUT Device Under Test
EARFCN Evolved Absolute Radio Frequency Channel Number
E-CID Enhanced Cell-ID (positioning method)
ECGI Evolved CGI
E-SMLC Evolved-Serving Mobile Location Centre
ECGI Evolved CGI
eMBB Enhanced Mobile Broadband
eNB E-UTRAN NodeB/eNodeB
ePDCCH enhanced Physical Downlink Control Channel
EPS Evolved Packet System
E-RAN Elastic RAN
E-SMLC evolved Serving Mobile Location Center
E-UTRA Evolved UTRA
E-UTRAN Evolved Universal Terrestrial Radio Access Network
FDD Frequency Division Duplex
FFS For Further Study
GERAN GSM EDGE Radio Access Network
gNB gNode B (a base station in NR; a Node B supporting NR and connectivity to NGC)
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
M2M Machine to Machine
MAC Medium Access Control
MBB Mobile Broadband
MBMS Multimedia Broadcast Multicast Services
MBSFN Multimedia Broadcast multicast service Single Frequency
Network
MBSFN ABS MBSFN Almost Blank Subframe
MDT Minimization of Drive Tests
MIB Master Information Block
MME Mobility Management Entity
MRTD Maximum Receive Timing Difference
MSC Mobile Switching Center
MTC Machine Type Communication
NGC Next Generation Core
NPDCCH Narrowband Physical Downlink Control Channel
NR New Radio
OAS Over-the-Air Synchronization
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PCH Paging Channel
PCI Physical Cell Identity/Identifier
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PS Packet Switched
PSCell Primary SCell
PSC Primary serving Cell
PSS Primary Synchronization Signal
PTP Precision Time Protocol
PUCCH Physical Uplink Control Channel
PUSCH Physical Uplink Shared Channel
QAM Quadrature Amplitude Modulation
RACH Random Access Channel
RAB Radio Access Bearer
RAN Radio Access Network
RANAP Radio Access Network Application Part
RAT Radio Access Technology
RF Radio Frequency
RLM Radio Link Monitoring
RNC Radio Network Controller
RNTI Radio Network Temporary Identifier
RRC Radio Resource Control
RRM Radio Resource Management
RRH Remote Radio Head
RRU Remote Radio Unit
RS Reference Signal
RSCP Received Signal Code Power
RSRP Reference Signal Received Power
RSRQ Reference Signal Received Quality
RSSI Received Signal Strength Indicator
RSTD Reference Signal Time Difference
RU Radio Unit
RV Redundancy Version
RX Receiver
RWR Release with Redirect
SCC Secondary Component Carrier
SCH Synchronization Channel
SCell Secondary Cell
SCG Secondary Cell Group
SCS Subcarrier Spacing
SDU Service Data Unit
SeNB Secondary eNodeB
SFN System Frame Number
SGW Serving Gateway
SI System Information
SIB System Information Block
SIB1 System Information Block Type 1
SINR Signal to Interference and Noise Ratio
SNR Signal to Noise Ratio
S-NSSAI Single Network Slice Selection Assistance Information
SON Self Organizing Network
SS Synchronization Signal
SSC Secondary Serving Cell
SSS Secondary Synchronization Signal
TBS Transport Block Size
TDD Time Division Duplex
TDOA Time Difference of Arrival
TE Time Error
TOA Time of Arrival
TSS Tertiary Synchronization Signal
TTI Transmission Time Interval
TX Transmitter
UARFCN UTMS Absolute Radio Frequency Channel Number
UE User Equipment
UL Uplink
UMTS Universal Mobile Telecommunication System USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method by a network node comprising:
determining a timing error associated with a closed loop comprising at least one radio link between two radio points, the timing error determined based on at least one timing measurement associated with the at least one radio link; and
adjusting timing information carried over a timing protocol link based on the timing error associated with the closed loop comprising the at least one radio link;
wherein determining the timing error associated with the closed loop comprises:
obtaining a PTP network topology associated with a first set of radio points, T, that includes the at least two radio points;
obtaining an Over-the-Air Synchronization (OAS) network topology associated with a second set of radio points, R, that includes the at least two radio points; and
selecting a set of network elements, N, that is an intersection of the first set of radio points, T, and the second set of radio points, R, and
wherein the PTP network topology and the OAS network topology form a connected graph.

2. The method of claim 1, wherein the timing protocol link comprises a Precision Time Protocol, PTP, link.

3. The method of claim 1, further comprising:
for an edge in the PTP network topology:
selecting an edge in the PTP network topology, the edge comprising a link between the two radio points;
determining a shortest path between the two radio points in the OAS network topology; and
calculating a PTP link time error for the edge based on a signed sum of the at least one timing error measurement associated with the shortest path in the OAS network between the two radio points.

4. The method of claim 3, further comprising determining at least one additional path between the two radio points in the OAS network and wherein the PTP link time error is calculated as a mean of the at least one timing error measurements associated with the shortest path and the at least one additional path.

5. The method of claim 4, further comprising repeating the step of determining at least one additional path between the two radio points in the OAS network for all edges in the PTP network topology.

6. The method of claim 1, further comprising:
defining all possible loops in the connected graph; and
determining at least one equation for each loop defined for the connected graph, wherein each one of the at least one equations expresses at least one unknown value associated with the PTP network topology in terms of the timing error determined based on at least one timing measurement associated with the at least one radio link.

7. The method of claim 6, wherein the possible loops comprises a plurality of loops, and the PTP link time error is calculated as a mean of each of the at least one unknown values expressed by the at least one equations.

8. The method of claim 6, further comprising determining that a matrix comprised of each of the at least one equations satisfies at least one condition for a solution of the at least one unknown value associated with the PTP network topology.

9. The method of claim 2, wherein adjusting the PTP link based on the timing error comprises:
configuring a PTP link asymmetry compensation on at least one edge of the PTP network topology.

10. The method of claim 1, wherein the PTP network topology is obtained from a transport network.

11. The method of claim 10, wherein the transport network comprises a fronthaul transport network or an backhaul transport network.

12. The method of claim 1, wherein the OAS network topology is received from a RAN network.

13. The method of claim 1, wherein the closed loop comprises a plurality of radio links between a plurality of radio points.

14. A network node adapted to:
determine a timing error associated with a closed loop comprising at least one radio link between two radio points, the timing error determined based on at least one timing measurement associated with the at least one radio link; and
adjust timing information carried over a timing protocol link based on the timing error associated with the closed loop comprising the at least one radio link;
wherein, when determining the timing error associated with the closed loop, the network node is adapted to:
obtain a PTP network topology associated with a first set of radio points, T, that includes the at least two radio points;
obtain an Over-the-Air Synchronization (OAS) network topology associated with a second set of radio points, R, that includes the at least two radio points;
select a set of network elements, N, that is an intersection of the first set of radio points, T, and the second set of radio points, R, and
wherein the PTP network topology and the OAS network topology form a connected graph.

15. The network node of claim 14, wherein the timing protocol link comprises a Precision Time Protocol, PTP, link.

16. The network node of claim 14, further adapted to:
for an edge in the PTP network topology:
select an edge in the PTP network topology, the edge comprising a link between the two radio points;
determine a shortest path between the two radio points in the OAS network topology; and
calculate a PTP link time error for the edge based on a signed sum of the at least one timing error measurement associated with the shortest path between the two radio points.

17. The network node of claim 16, further adapted to determine at least one additional path between the two radio points in the OAS network, and wherein the PTP link time error is calculated as a mean of the at least one timing error measurements associated with the shortest path and the at least one additional path.

18. The network node of claim 14, further adapted to:
define all possible loops in the connected graph; and
determine at least one equation for each loop defined for the connected graph, wherein each one of the at least one equations expresses at least one unknown value associated with the PTP network topology in terms of the timing error determined based on at least one timing measurement associated with the at least one radio link.

19. The network node of claim 18, wherein the possible loops comprises a plurality of loops, and wherein the PTP link time error is calculated as a mean of each of the at least one unknown values expressed by the at least one equations.

20. The network node of claim 18, further adapted to determine that at least one condition for a solution of the at least one unknown value associated with the PTP network topology is satisfied.

21. The network node of claim 14, wherein, when adjusting the PTP link based on the timing error, the network node is adapted to:

configure a PTP link asymmetry compensation on at least one edge of the PTP network topology.

22. The network node of claim 14, wherein the PTP network topology is obtained from a transport network.

23. The network node of claim 22, wherein the transport network comprises a Centralized-Radio Access Network (C-RAN) transport network or an Elastic-Radio Access Network (E-RAN) transport network.

24. The network node of claim 14, wherein the OAS network topology is received from a RAN network.

* * * * *